United States Patent
Kingston et al.

(10) Patent No.: US 9,508,076 B2
(45) Date of Patent: Nov. 29, 2016

(54) SERVICE FOR ACCOUNT WITH UNAVAILABLE FUNDS OR CREDIT USING A PASSCODE

(71) Applicant: BANK OF AMERICA CORPORATION, Charlotte, NC (US)

(72) Inventors: Tamara S. Kingston, Peoria, AZ (US); Willard Andrew Barr, Charlotte, NC (US); Doris Maria Garrett, Walnut Creek, CA (US); Mark Allan Nelson, Waxhaw, NC (US); Jonathan H. Tucker, Charlotte, NC (US); John Franklin Tuders, Harrisburg, NC (US); Elbert Lee Whitler, Webster Groves, MO (US); Paul Ronald DeKoster, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/840,586

(22) Filed: Mar. 15, 2013

(65) Prior Publication Data
US 2013/0218777 A1 Aug. 22, 2013

Related U.S. Application Data

(63) Continuation-in-part of application No. 13/094,564, filed on Apr. 26, 2011, now abandoned, and a continuation-in-part of application No. 12/879,866, filed on Sep. 10, 2010, now Pat. No. 9,047,639.

(60) Provisional application No. 61/416,652, filed on Nov. 23, 2010, provisional application No. 61/436,196, filed on Jan. 26, 2011.

(51) Int. Cl.
G06Q 30/02 (2012.01)
G06Q 20/40 (2012.01)
(Continued)

(52) U.S. Cl.
CPC ............ *G06Q 20/405* (2013.01); *G06Q 20/20* (2013.01); *G06Q 20/3278* (2013.01); *G06Q 20/40* (2013.01); *G06Q 20/4012* (2013.01); *G06Q 30/06* (2013.01); *G06Q 40/02* (2013.01)

(58) Field of Classification Search
USPC .............................................. 705/35, 75, 1.1
See application file for complete search history.

(56) References Cited

U.S. PATENT DOCUMENTS

| 6,021,400 A | 2/2000 | Gallacher et al. |
| 6,081,792 A | 6/2000 | Cucinotta et al. |

(Continued)

OTHER PUBLICATIONS

U.S. Appl. No. 12/879,866, filed Sep. 10, 2010, Quintiliani et al.
(Continued)

*Primary Examiner* — William Rankins
(74) *Attorney, Agent, or Firm* — Michael A. Springs; Moore & Van Allen PLLC; Peter B. Stewart

(57) ABSTRACT

In general terms, embodiments of the present invention relate to methods and apparatuses for providing a service for account with unavailable funds or credit using a passcode for the account with unavailable funds or credit For example, in some embodiments, a method is provided that includes: (a) receiving transaction information associated with a transaction, where the transaction involves an account; (b) determining, based at least partially on the transaction information, that the account will exceed available funds or credit as a result of the transaction; (c) receiving a passcode for the account with unavailable funds or credit associated with the account; and (d) authorizing the transaction based at least partially on the receiving the passcode for the account with unavailable funds or credit.

10 Claims, 6 Drawing Sheets

(51) Int. Cl.
*G06Q 20/20* (2012.01)
*G06Q 40/02* (2012.01)
*G06Q 20/32* (2012.01)
*G06Q 30/06* (2012.01)

(56) References Cited

U.S. PATENT DOCUMENTS

| | | |
|---|---|---|
| 6,457,640 B2 | 10/2002 | Ramachandran et al. |
| 7,216,083 B2 | 5/2007 | Parmelee et al. |
| 7,370,004 B1 | 5/2008 | Patel et al. |
| 7,428,495 B2 | 9/2008 | Dhar et al. |
| 2002/0040339 A1 | 4/2002 | Dhar et al. |
| 2002/0055904 A1 | 5/2002 | Mon |
| 2003/0009418 A1 | 1/2003 | Green et al. |
| 2004/0215566 A1 | 10/2004 | Meurer |
| 2006/0059085 A1 | 3/2006 | Tucker |
| 2006/0129478 A1 | 6/2006 | Rees |
| 2006/0212407 A1* | 9/2006 | Lyon ................ 705/71 |
| 2006/0249568 A1 | 11/2006 | Scanlon |
| 2007/0080207 A1 | 4/2007 | Williams |
| 2007/0106558 A1 | 5/2007 | Mitchell et al. |
| 2007/0118470 A1 | 5/2007 | Warren et al. |
| 2007/0262137 A1 | 11/2007 | Brown |
| 2008/0103970 A1 | 5/2008 | Books et al. |
| 2008/0210754 A1 | 9/2008 | Lovett |
| 2009/0055313 A1 | 2/2009 | Elterich |
| 2009/0081990 A1 | 3/2009 | Granucci et al. |
| 2009/0089205 A1 | 4/2009 | Bayne |
| 2009/0094125 A1 | 4/2009 | Killian et al. |
| 2009/0171837 A1 | 7/2009 | Moreno |
| 2009/0216676 A1* | 8/2009 | Mathur et al. ............... 705/44 |
| 2009/0261161 A1 | 10/2009 | Blossom |
| 2009/0281904 A1 | 11/2009 | Pharris |
| 2010/0065628 A1 | 3/2010 | Carmichael et al. |
| 2010/0235283 A1* | 9/2010 | Gerson .................. 705/75 |
| 2011/0082767 A1* | 4/2011 | Ryu .................... G06Q 20/32 705/26.35 |
| 2011/0125643 A1 | 5/2011 | Cameo et al. |
| 2011/0202415 A1* | 8/2011 | Casares et al. ............. 705/17 |
| 2011/0320292 A1* | 12/2011 | Perdue .................. 705/16 |
| 2012/0066077 A1 | 3/2012 | Kingston et al. |
| 2012/0066127 A1 | 3/2012 | Kingston et al. |
| 2012/0264405 A1* | 10/2012 | Bravo et al. ............. 455/414.1 |

OTHER PUBLICATIONS

A-9 Model Consent Form for Overdraft Services, 1 page total; http://www.federalreserve.gov/DCAA/RegulationE/20081218/A-9.pdf.

"5 Ideas to Fix the Ugly in Overdraft Fees", Sep. 23, 2009 (8 pages total); downloaded Sep. 22, 2010; http://thefinancialbrand.com/7795/fixing-overdraft-ugliness/

* cited by examiner

SERVICE FOR ACCOUNT WITH UNAVAILABLE FUNDS OR CREDIT USING A PASSCODE

CROSS-REFERENCE TO RELATED APPLICATIONS

The present application is a continuation-in-part application of, and claims priority to, U.S. patent application Ser. No. 13/094564, which was filed Apr. 26, 2011, and is entitled "Overage Service Using Overage Passcode", and which is incorporated by reference herein in its entirety. The present application also claims priority to U.S. patent application Ser. No. 12/879,866, which was filed on Sep. 10, 2010, and is entitled "Service Participation Acknowledgment System," and which is incorporated by reference herein in its entirety. The present application also claims priority to U.S. Provisional Patent Application No. 61/416,652, which was filed on Nov. 23, 2010, and is entitled "Overage Communication Systems," and which is incorporated by reference herein in its entirety. The present application further claims priority to U.S. Provisional Patent Application No. 61/436,196, which was filed on Jan. 26, 2011, and is entitled "Overage Communication Systems," and which is incorporated by reference herein in its entirety.

BACKGROUND

Financial institution customers are constantly looking for new and useful ways to better manage their finances. This is particularly so given that most of today's customers have multiple financial accounts and the consequences associated with mismanaging or forgetting about any one of them can lead to unexpected and/or unwanted outcomes. For example, a customer may cause his checking account to exceed available funds and incur a related exceeded available funds payment by engaging in a transaction that he mistakenly believes his account can cover. Accordingly, there is a need to provide methods and apparatuses that help financial institution customers manage their finances in ways that avoid or reduce unexpected or unwanted outcomes.

SUMMARY OF SELECTED EMBODIMENTS OF THE PRESENT INVENTION

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In general terms, embodiments of the present invention relate to methods and apparatuses for providing a service for account with unavailable funds or credit using a passcode for the account with unavailable funds or credit (e.g., personal identification number (PIN), password, numeric code, or the like.). As a specific example, in some embodiments, a method involves: (a) a financial institution customer using a primary PIN (e.g., "3441") associated with the customer's checking account to engage in a transaction at a point-of-sale (POS) device (e.g., at a merchant); (b) a financial institution apparatus determining that the checking account will exceed available funds as a result of the transaction (e.g., the checking account does not have funds available to cover the transaction); (c) the apparatus declining the transaction that may cause the checking account to exceed available funds as a result of determining that the checking account will exceed available funds; (d) the customer inputting a PIN (e.g., "5789") for the checking account with unavailable funds into a keypad of the POS device in order to indicate that the customer consents to causing the checking account to exceed available funds and/or to completing the transaction that may cause the checking account to exceed available funds; and (e) the apparatus authorizing and/or completing the transaction based at least partially on the apparatus receiving the PIN for the checking account with unavailable funds from the customer via the POS device.

In this example, by using the PIN for the checking account with unavailable funds, the customer is empowered to decide whether he wants exceed available funds in the checking account, complete the transaction, incur an exceeded available funds payment for causing his checking account to exceed available funds and/or for using the service for account with unavailable funds, or the like, which reduces or eliminates the possibility that the customer will unknowingly or unexpectedly engage in a transaction that may cause the checking account to exceed available funds (and/or unknowingly or unexpectedly incur an exceeded available funds payment). In addition, because the customer inputs the PIN for the checking account with unavailable funds during the transaction (e.g., after the transaction is initiated but before the transaction is authorized and/or completed), the customer is able to make this decision in real-time and/or on a per-transaction basis. Further, in this example embodiment, the customer may input his PIN for the checking account with unavailable funds into the POS device discreetly, thereby avoiding any potential embarrassment associated with causing the checking account to exceed available funds and/or using the service for account with unavailable funds.

In more general terms, some embodiments of the present invention provide a method that includes: (a) receiving transaction information associated with a transaction, where the transaction involves an account; (b) determining, based at least partially on the transaction information, that the account will exceed available funds or credit as a result of the transaction; (c) receiving a passcode for the account with unavailable funds or credit ; and (d) authorizing the transaction based at least partially on the receiving the passcode for the account with unavailable funds or credit.

Other embodiments of the present invention provide an apparatus that includes: (a) a communication interface configured to: (i) receive, via a payment network, transaction information associated with a transaction, where the transaction involves an account; and (ii) receive a passcode for the account with unavailable funds or credit ; and (b) a processor operatively connected to the communication interface and configured to: (i) determine, based at least partially on the transaction information, that the account will exceed available funds or credit as a result of the transaction; and (ii) authorize the transaction based at least partially on the communication interface receiving the passcode for the account with unavailable funds or credit.

Still other embodiments provide a computer program product having a non-transitory computer-readable medium, where the non-transitory computer-readable medium includes one or more computer-executable program code portions that, when executed by a computer, cause the computer to: (a) receive transaction information associated with a transaction, where the transaction involves an account; (b) determine that the account will exceed available funds or credit as a result of the transaction; (c) receive a passcode for the account with unavailable funds or credit after the computer determines that account will exceed available funds or credit; and (d) authorize the transaction based at least partially on the computer receiving the passcode for credit account with unavailable funds.

Other embodiments of the present invention provide a method that includes: (a) receiving an authorization request associated with a transaction, where the transaction involves an account, and where the account is associated with a primary passcode; (b) determining that the account has exceeded available funds or credit to cover the transaction; (c) determining that the authorization request includes the primary passcode; (d) declining the authorization request based at least partially on the determining that the authorization request includes the primary passcode and the determining that the account has exceeded available funds or credit; (e) receiving a second authorization request associated with a second transaction, where the second transaction involves the account; (f) determining that the second authorization request includes a passcode for the account with unavailable funds or credit ; and (g) approving the second authorization request based at least partially on the determining that the second authorization request includes the passcode for the account with unavailable funds or credit.

Still other embodiments of the present invention provide a method that includes: (a) presenting, by a holder of an account, account information at a transaction machine to engage in a transaction, where the account information is associated with the account; (b) receiving, by the holder, a message that prompts the holder to provide a passcode for the account with unavailable funds or credit, where the receiving occurs while the holder is still at the transaction machine; and (c) inputting, by the holder, the passcode for the account with unavailable funds or credit into the transaction machine or into a mobile device accessible to a holder, where the inputting occurs while the holder is still at the transaction machine, and where the transaction is approved after the holder inputs the passcode for the account with unavailable funds or credit.

BRIEF DESCRIPTION OF THE DRAWINGS

Figure 1:
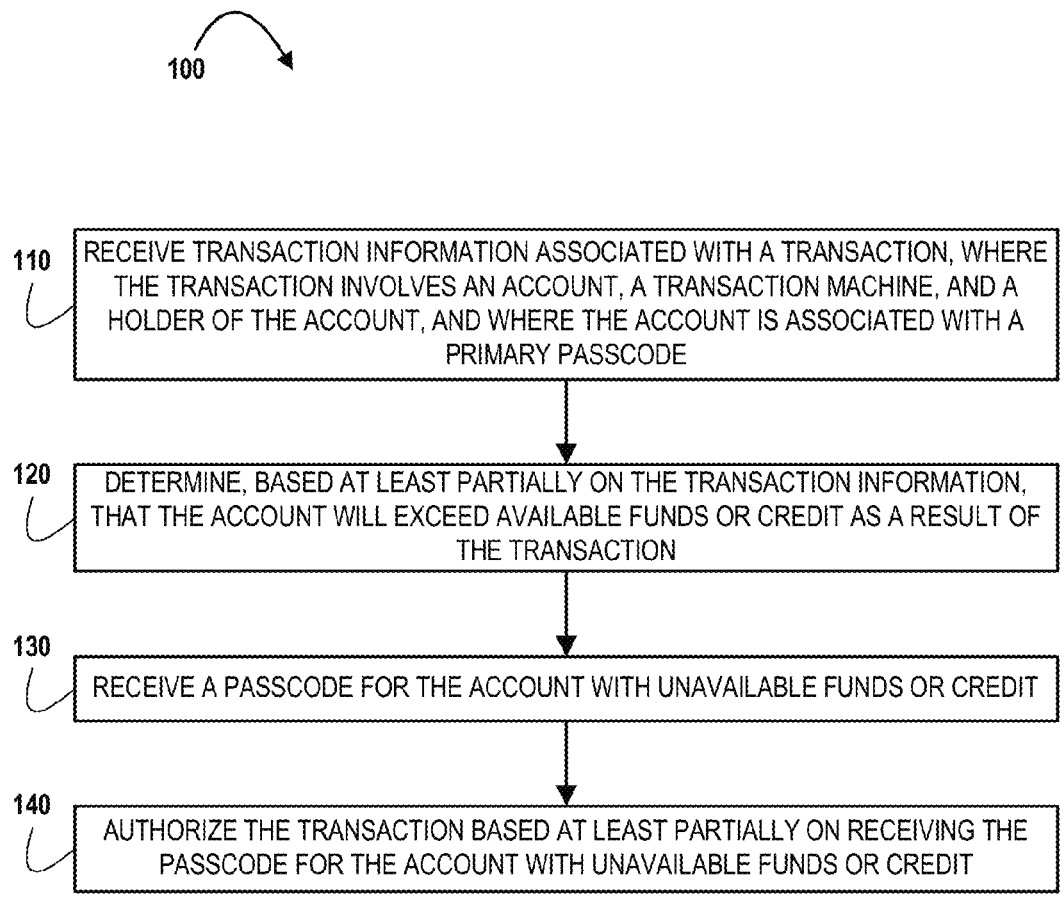
Figure 2:
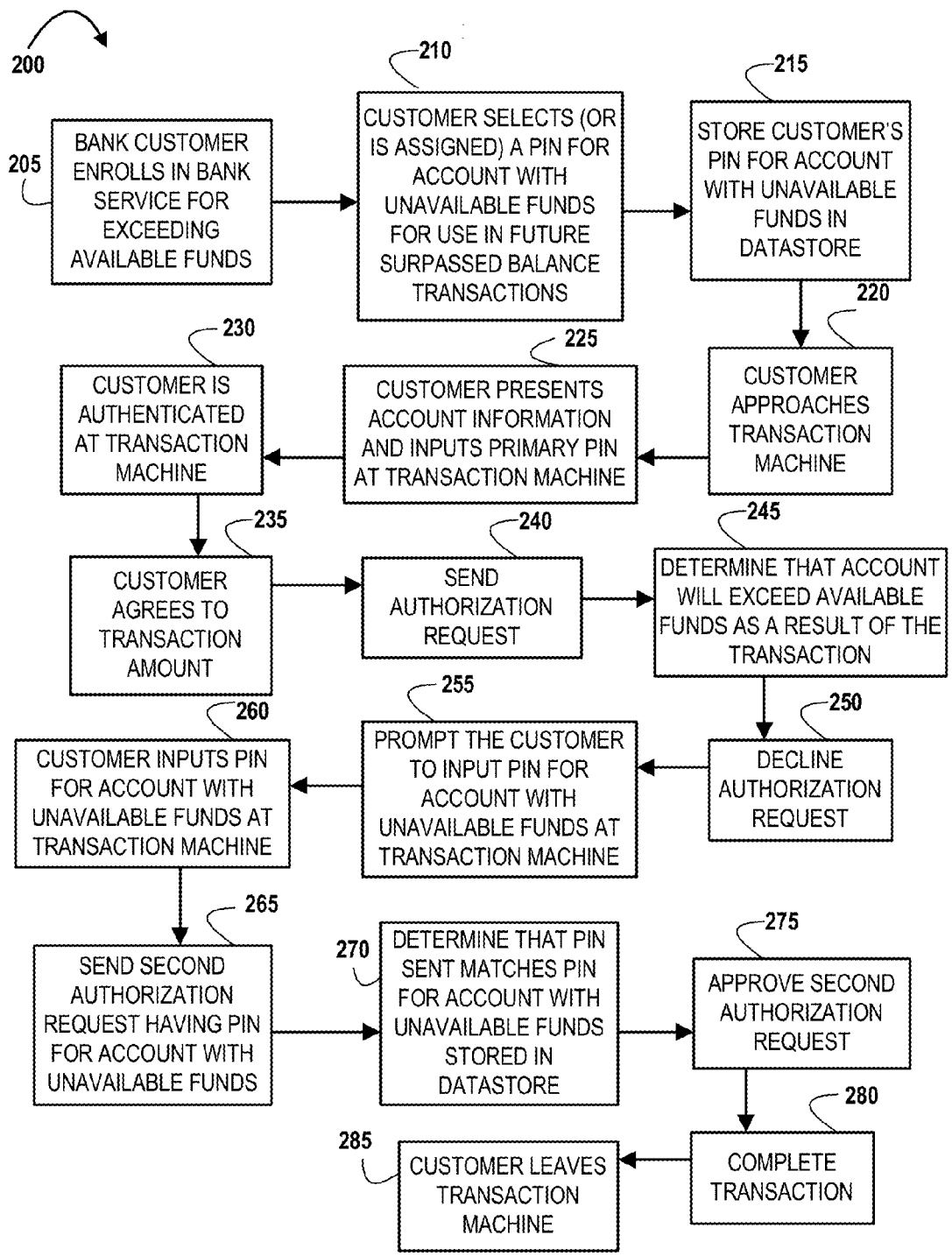
Figure 3:
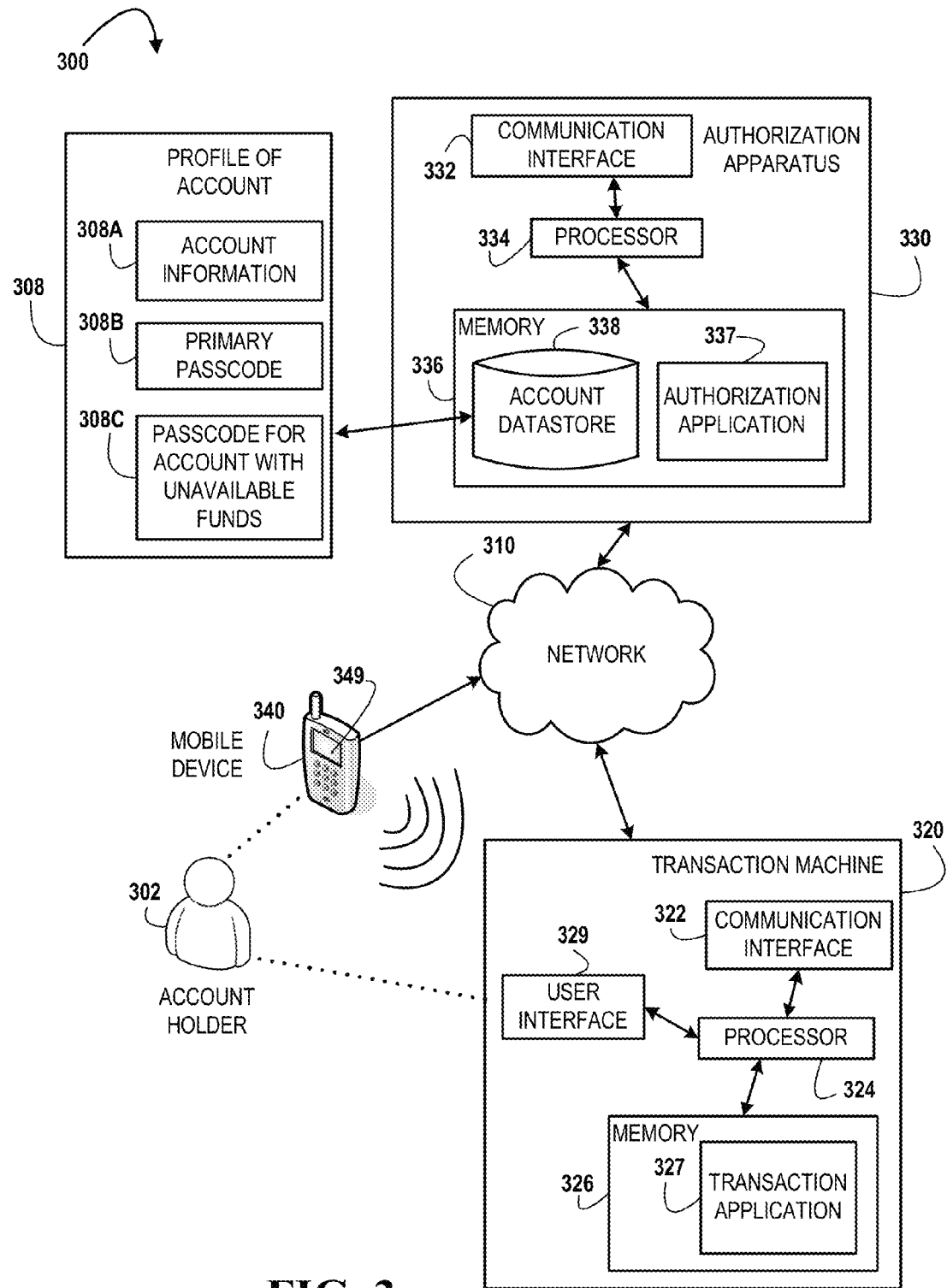
Figure 3A:
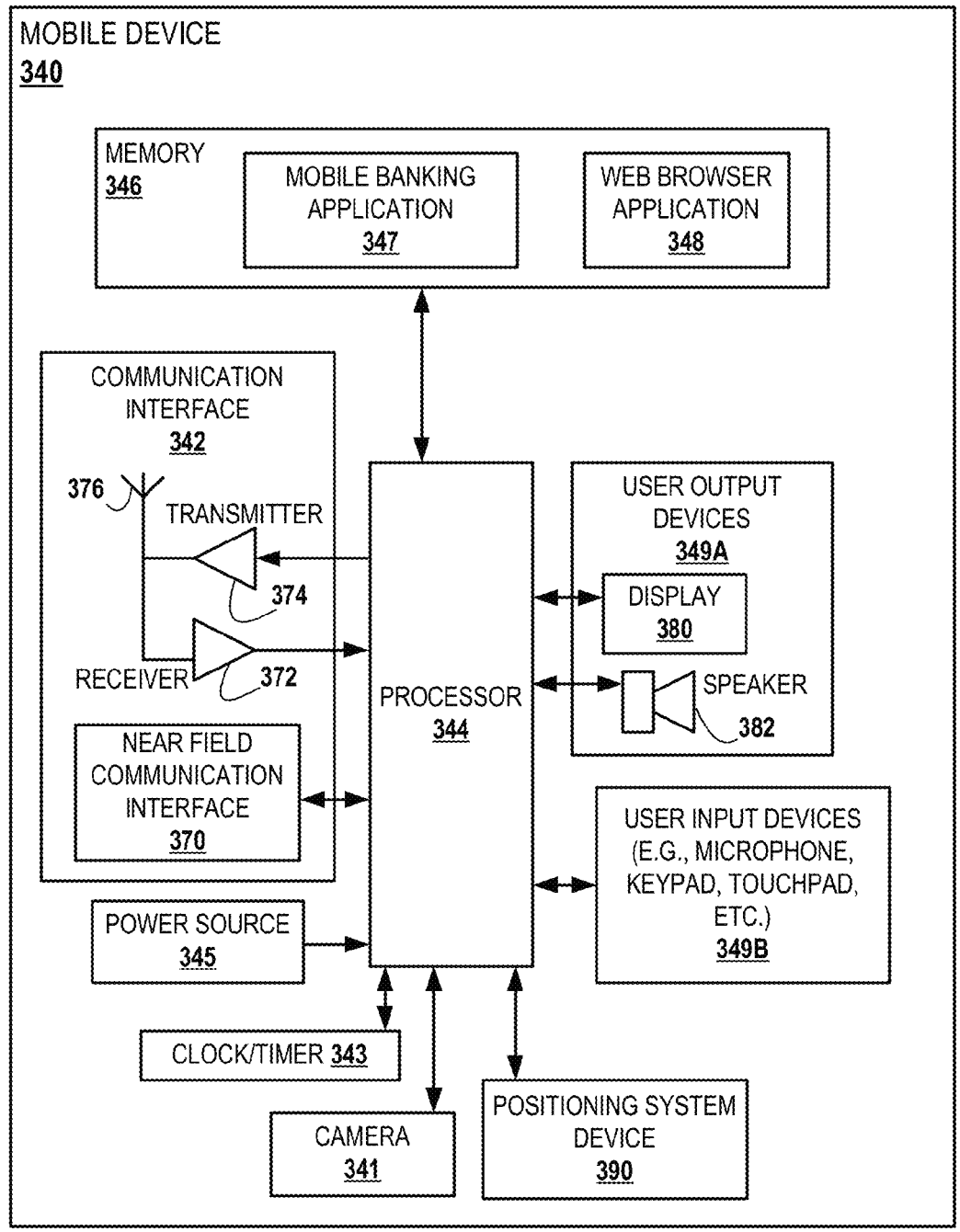
Figure 4:
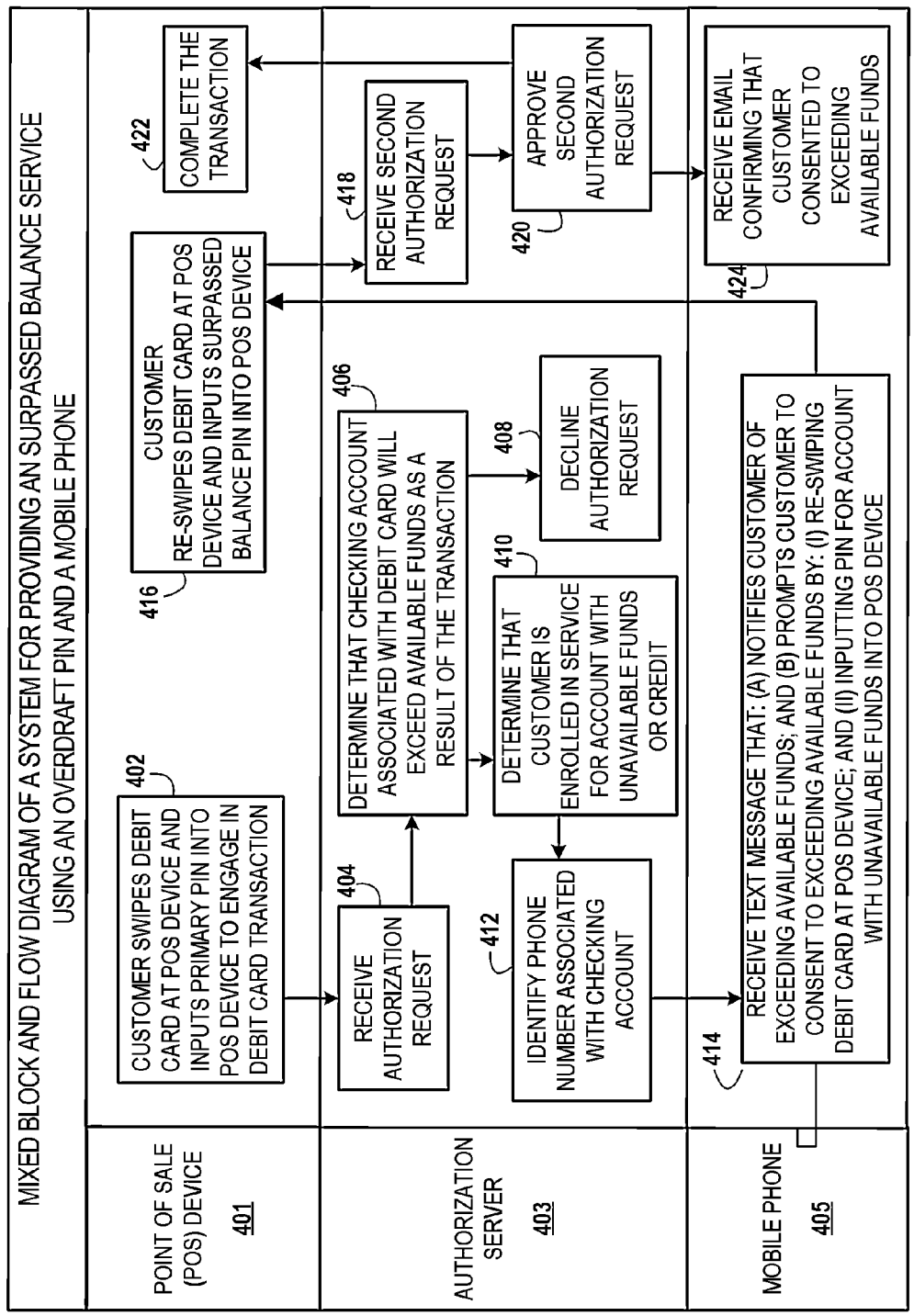
Figure 5:
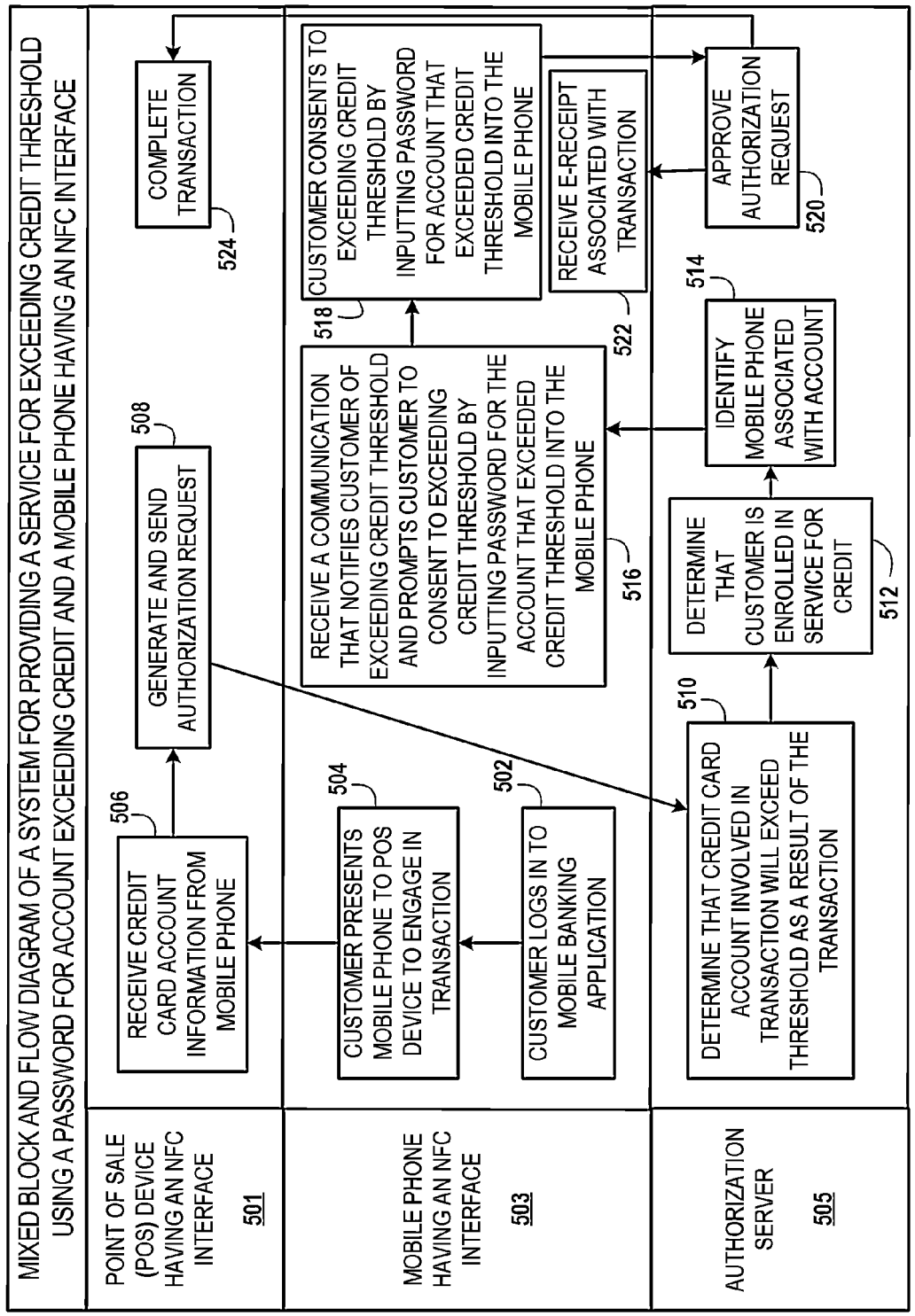

Having thus described some embodiments of the present invention in general terms, reference will now be made to the accompanying drawings, where:

FIG. 1 is a flow diagram illustrating a general process flow for providing a service for account with unavailable funds or credit in the account using a passcode for the account with unavailable funds or credit, in accordance with an embodiment of the present invention;

FIG. 2 is a flow diagram illustrating a more-detailed process flow for providing a service for account with unavailable funds or credit in the account using a PIN for the account with unavailable funds, in accordance with an embodiment of the present invention;

FIG. 3 is a block diagram illustrating technical components of a system for providing a service for account with unavailable funds or credit in the account, in accordance with an embodiment of the present invention;

FIG. 3A is a block diagram illustrating technical components of a mobile device configured to participate in a service for account with unavailable funds or credit, in accordance with an embodiment of the present invention;

FIG. 4 is a mixed block and flow diagram of a system for providing a service for checking account with unavailable funds using a PIN for the checking account with unavailable funds and a mobile phone, in accordance with an embodiment of the present invention; and FIG. 5 is a mixed block and flow diagram of a system for providing a service for account exceeding credit threshold using a password for the account credit threshold and a mobile phone having a near field communication (NFC) interface, in accordance with an embodiment of the present invention.

DETAILED DESCRIPTION OF EMBODIMENTS OF THE PRESENT INVENTION

Referring now to FIG. 1, a general process flow 100 for providing a service for account with unavailable funds or credit using a passcode for the account with unavailable funds or credit is provided, in accordance with an embodiment of the present invention. In some embodiments, the process flow 100 is performed by an apparatus (i.e., one or more apparatuses) having hardware and/or software configured to perform one or more portions of the process flow 100. In such embodiments, as represented by block 110, the apparatus is configured to receive transaction information associated with a transaction, where the transaction involves an account (e.g., a deposit account, a credit account, or the like.), a transaction machine (e.g., a POS device, an automated teller machine (ATM), or the like.), and a holder of the account (and/or the user of the transaction machine), and where the account is associated with a primary passcode (e.g., "1248," "panthers"). As represented by block 120, the apparatus is also configured to determine, based at least partially on the transaction information, that the account will exceed available funds or credit (e.g., cause an account to exceed available funds, exceed a credit threshold, or the like.) as a result of the transaction. In addition, as represented by block 130, the apparatus is further configured to receive a passcode for the account with unavailable funds or credit (e.g., "4518," "exceededamount123," or the like.). As represented by block 140, the apparatus is further configured to authorize the transaction based at least partially on the apparatus receiving the passcode for the account with unavailable funds or credit For simplicity, it will be understood that the portion of the process flow represented by block 120 is sometimes referred to herein as the "surpassed balance determination." Also, the phrase "surpassed balance transaction" is sometimes used to refer to a transaction that, if completed, would cause the account to exceed available funds or credit (e.g., cause a deposit account to exceed available funds, exceed a credit threshold, or the like.). In addition, it will be understood that, in some embodiments, the term "determine" is meant to have one or more of its ordinary meanings (i.e., its ordinary dictionary definition(s)), but that in other embodiments, that term is meant to have one or more ordinary meanings of one or more of the following terms: decide, conclude, verify, ascertain, find, discover, learn, calculate, observe, read, and/or the like. Further, in some embodiments, the phrase "based at least partially on" is meant to have one or more of its ordinary meanings, but that in other embodiments, that phrase is meant to have one or more ordinary meanings of one or more of the following terms and/or phrases: as a result of, because of, after, if, when, in response to, and/or the like. Still further, in some embodiments, the term "via" is meant to have its one or more ordinary meanings, but in other embodiments, that term is meant to have one or more ordinary meanings of one or more of the following terms and/or phrases: from, through, per, with the assistance of, by way of, and/or the like.

It will also be understood that the apparatus having the process flow 100 can include one or more separate and/or different apparatuses. For example, in some embodiments, one apparatus (e.g., the transaction machine 320 described in connection with FIG. 3, or the like.) is configured to perform the portion of the process flow 100 represented by block 110, and a second apparatus (e.g., the authorization apparatus 330) is configured to perform the portions represented by blocks 120-140. As still another example, in some embodiments, a single apparatus (e.g., the authorization apparatus 330) is configured to perform each and every portion of the process flow 100. It will also be understood that, in some embodiments, a transaction machine (e.g., the transaction machine 320) is configured to perform one or more (or all) of the portions of the process flow 100, and that in some embodiments, that transaction machine includes, is included in, and/or is embodied as the transaction machine referred to in block 110.

Regarding block 110, the term "passcode," as used herein, generally refers to a personal identification number (PIN), code, string, keyword, number, phrase, password, username, personal identifier, and/or the like that the holder uses to access banking services and/or to engage in transactions. Indeed, in some embodiments, the passcode is required to access those banking services and/or to engage in those transactions. For example, in some embodiments, the passcode must be input into the transaction machine referred to in the process flow 100 before the transaction machine will perform the transaction. Also, it will be understood that the passcode may be of any length and include any type of character. For example, in some embodiments, the passcode is a four or six digit PIN (e.g., "3451," "8911," "566912," or the like.) that the holder must input into an ATM to withdraw funds and/or into a POS device to complete a purchase transaction. Of course, it will be understood that, in other embodiments, the passcode is a different length and/or includes one or more letters and/or symbols in addition to, or instead of, numbers.

Also, it will be understood that, in some embodiments, the passcode is secret and/or confidential, such that, for example, the passcode is known only to the holder and the holder's financial institution. Additionally or alternatively, in some embodiments, the financial institution that maintains the account associates the passcode with the holder, the account, and/or the debit and/or credit card associated with the account. Of course, because a financial institution may maintain millions of accounts, a particular passcode associated with one account may actually be the same passcode associated with another account. In such cases, the identity of the passcode cannot be used by itself to actually identify a holder of an account. However, in some embodiments of the present invention, the passcode is uniquely associated with the holder, the account, and/or a debit and/or card associated with the account, such that, for example, the holder, the account, and/or the card may be identified simply by knowing the identity of the passcode (and/or vice versa). Additionally or alternatively, in some embodiments, where the passcode is secret and/or confidential, the passcode may be used to authenticate the holder (e.g., verify that the holder is who he says he is) to the apparatus having the process flow 100, to the financial institution that maintains the account, and/or to a merchant and/or counterparty involved in the transaction.

It will be understood that a passcode may be different than a card verification value (CVV). As understood herein, a CVV is typically a three or four digit number that is printed on a debit and/or credit card, and that may be used, for example, during web or phone transactions, to verify that the card holder actually possesses the debit and/or credit card at the time of the transaction. In contrast, a passcode is not typically printed on a debit and/or credit card associated with the account. Further, because the CVV is typically printed on a card, anyone with access to that card may view the CVV. Thus, in embodiments where the passcode is known only to the holder of the account and to the financial institution that maintains the account, the identity of the passcode is typically a secret more closely guarded than the identity of the CVV.

Additionally, it will be understood that there are two kinds of passcodes referred to herein, a primary passcode and a passcode for the account with unavailable funds or credit. It will be understood that the primary passcode refers to a passcode typically used to engage in regular, day-to-day transactions and typically associated with the holder, the account, and/or the debit and/or credit card involved in those transactions. The passcode for the account with unavailable funds or credit also refers to a passcode that is associated with the holder, account, and/or debit and/or credit card involved in a transaction, but the passcode for the account with unavailable funds or credit is typically used to engage in a surpassed balance transaction as opposed to a regular transaction. In some embodiments, the holder uses the passcode for the account with unavailable funds or credit to "consent to exceeding available funds or credit," which is a phrase meant to be understood in its broadest sense. For example, in some embodiments, the phrase "consent to exceeding available funds or credit" means consent to: (a) exceeding available funds or credit (e.g., the account and/or the holder incurring the amount that exceeds the available funds, or the like.); (b) incurring an exceeded available funds or credit payment associated with the amount that exceeds available funds or credit (e.g., now or at the end of the day in which the transaction occurred if the account settles negative, or the like.); (c) one or more terms of a service for account with unavailable funds or credit; (d) using the service for account with unavailable funds or credit for this transaction (i.e., the transaction referred to in block 110); (e) incurring an exceeded available funds or credit payment associated with using the service for account with unavailable funds or credit; and/or (f) completing the transaction. Thus, for example, the holder may provide the passcode for the account with unavailable funds or credit to the apparatus having the process flow 100 to indicate that the holder consents to: (a) incurring an amount that exceeds the available funds or credit; (b) incurring an exceeded available funds or credit payment associated with the amount that exceeds the available funds; and (c) completing the transaction. Further, it will be understood that any given holder, account, and/or debit and/or credit card may be associated with a primary passcode and a passcode for the account with unavailable funds or credit. Also, it will be understood that the primary passcode is typically different than the associated passcode for the account with unavailable funds or credit. For example, in some embodiments, the primary passcode for the account is the four digit PIN "0786," whereas the passcode for the account with unavailable funds or credit is the four digit PIN "1386." Further, as understood herein, the passcode for the account with unavailable funds or credit is sometimes referred to as a "surpassed credit threshold passcode" when associated with a credit account and referred to as "surpassed available funds passcode" when associated with a deposit account.

Also, in some embodiments, the primary passcode and/or the passcode for the account with unavailable funds or credit referred to in the process flow 100 may be selected by the holder of the account before the transaction referred to in the process flow 100 is initiated (e.g., when the holder enrolls in a service for account with unavailable funds or credit). However, in other embodiments, the passcode for the account with unavailable funds or credit is provided to the holder for the first time during the transaction referred to in the process flow 100 (e.g., via a message sent to the transaction machine or the holder's mobile device), such that the holder does not know the identity of the passcode for the account with unavailable funds or credit before the transaction is initiated. In some of these embodiments, the passcode for the account with unavailable funds or credit is dynamically generated, generated in real-time during the transaction, and/or automatically generated after the apparatus makes the amount that exceeds the available funds determination but before the apparatus authorizes the transaction. This concept of generating and/or providing the passcode for the account with unavailable funds or credit during the transaction is discussed in more detail later herein.

Still regarding block 110, the phrase "transaction machine," as used herein, typically refers to an interactive computer terminal that is configured to initiate, perform, complete, and/or facilitate one or more financial transactions. Examples of transaction machines include, but are not limited to, ATMs, POS devices (e.g., merchant terminals, or the like.), self-service machines (e.g., vending machine, self-checkout machine, parking meter, or the like.), public and/or business kiosks (e.g., an Internet kiosk, ticketing kiosk, bill pay kiosk, or the like.), mobile phones (e.g., feature phone, smart phone, or the like.), gaming devices, computers (e.g., personal computers, tablet computers, laptop computers, or the like.), personal digital assistants (PDAs), and/or the like.

In some embodiments, the transaction machine referred to in block 110 is located in a public place and is available for public use (e.g., on a street corner, on the exterior wall of a banking center, at a public rest stop, or the like.). In other embodiments, the transaction machine is additionally or alternatively located in a place of business and available for public and/or business customer use (e.g., in a retail store, post office, banking center, grocery store, or the like.). In accordance with some embodiments, the transaction machine is not owned by the user of the transaction machine and/or the holder of the account referred to in block 110. However, in other embodiments, the transaction machine is located in a private place, is available for private use, and/or is owned by the user of the transaction machine and/or the holder referred to in block 110.

Further regarding block 110, the transaction involving the holder and the transaction machine can include any number and/or type of transaction(s) involving a transaction machine. For example, in some embodiments, the transaction includes one or more of the following: purchasing, renting, selling, and/or leasing goods and/or services (e.g., groceries, stamps, tickets, DVDs, vending machine items, or the like.); withdrawing cash; making payments to creditors (e.g., paying monthly bills; paying federal, state, and/or local taxes and/or bills; or the like.); sending remittances; transferring balances from one account to another account; loading money onto stored value cards; donating to charities; and/or the like.

Also, the account referred to in the process flow 100 can include any number and/or type of account(s). For example, in some embodiments, the account includes a checking account, savings account, money market account, investment account, brokerage account, certificate of deposit account, and/or any other type of deposit account. In some embodiments, the deposit account is one or more accounts that can exceed available funds. Of course, it will be understood that embodiments of the present invention may also apply to one or more credit accounts, such as a credit card account, line of credit (LOC) account, store credit account, and/or the like. Additionally or alternatively, in some embodiments, the credit account is one or more accounts that can exceed credit threshold."

In some embodiments, the account, the transaction machine, and the apparatus having the process flow 100 are each controlled, serviced, owned, managed, operated, and/or maintained (collectively referred to herein as "maintained" for simplicity) by a single financial institution. For example, in some embodiments, the apparatus is maintained by a bank, the account is maintained by the bank, the transaction machine is owned by the bank, and the holder is a customer of the bank. Of course, it will be understood that, in some embodiments, the apparatus, the transaction machine, and/or the account are not maintained by the same financial institution (or any financial institution).

The transaction information referred to in block 110 can be any information that identifies, defines, describes, and/or is otherwise associated with the transaction. Exemplary transaction information includes, but is not limited to, the party(ies) involved in the transaction, the date and/or time of the transaction, the posting date of the transaction, the account(s) involved in the transaction, the primary passcode for the account, the passcode for the account with unavailable funds or credit, the transaction amount(s) associated with the transaction, the good(s) and/or service(s) involved in the transaction (e.g., product names, stock keeping unit (SKU) information, universal product code (UPC) information, or the like.), a description of the transaction (which, itself, can include any transaction information, e.g., the description may describe the transaction status, the goods and/or services involved in the transaction, or the like.), and/or the like.

The transaction information can also include any information that defines and/or identifies the type of the transaction. As understood herein, the transaction type of a transaction may be defined, at least in part, by the one or more goods and/or services involved in the transaction, the one or more types of accounts involved in the transaction (e.g., credit card transaction, savings account transaction, or the like.), the one or more parties involved in the transaction (e.g., account holder, bank, teller, merchant, counterparty, or the like.), when the transaction was initiated (e.g., time of day, day of week, or the like.), and/or the like. In some embodiments, the transaction type is defined, at least in part, by the one or more channels through which the transaction is conducted, such as, for example, a POS device (e.g., merchant terminal, or the like.), ATM, teller terminal, electronic banking account (e.g., online banking account, mobile banking account, SMS banking account, or the like.), personal computer, kiosk, call center, and/or the like. Additionally or alternatively, in some embodiments, the transaction type is defined, at least in part, by the one or more instruments and/or methods used to conduct the transaction, such as, for example, paper checks, electronic checks, debit cards, credit cards, ATM cards, checkcards, wire transfers, online bill pay, automated clearing house (ACH), contactless payments, near field communication (NFC) interface payments, cash payments, and/or the like.

In some embodiments, the transaction information additionally or alternatively identifies and/or describes one or more merchant category codes (MCCs) associated with the transaction. As used herein, the phrase "merchant category code" generally refers to a number assigned to a merchant by a financial institution, where the number is used to classify the merchant by the type of goods and/or services the merchant provides. In some embodiments, the merchant category code is a four digit number assigned by a credit card provider (which, in some embodiments, is a bank). Exemplary merchant category codes include "5814" for fast food restaurants, "5933" for pawn shops, "8062" for hospitals, and "5411" for grocery supermarkets. A merchant category code may generally refer to the goods and/or services provided by a merchant (e.g., hospital, fast food restaurant, or the like.) and/or may specifically identify the name of an individual merchant. In other words, individual industries and/or individual merchants can have their own merchant category codes. In some embodiments, a transaction type may be defined, at least in part, by one or more merchant category codes associated with the transaction.

It will be understood that any given transaction may have more than one transaction type. For example, in accordance with some embodiments, a cash withdrawal transaction conducted an ATM may be defined as a cash-related transaction, a withdrawal transaction, and/or an ATM transaction. As another example, in accordance with some embodiments, a purchase transaction involving a POS device and a mobile device, where each of the POS device and the mobile device has an NFC interface, may be defined as a purchase transaction, a POS device transaction, mobile device transaction, an NFC interface transaction, and/or a contactless payment transaction. As still another example, in accordance with some embodiments, a purchase transaction involving a POS device maintained by a grocery store may be defined as a purchase transaction, a POS device transaction, a grocery store transaction, and/or a merchant category code "5411" transaction.

Also regarding block 110, the apparatus having the process flow 100 can be configured to receive the transaction information in any way. For example, in some embodiments, the apparatus is configured to receive an authorization request associated with the transaction, where the authorization request includes the transaction information. In some embodiments, the apparatus is embodied as an authorization apparatus maintained by a financial institution, where the apparatus is configured to consider, approve, and/or decline authorization requests for debit transactions, credit transactions, ATM transactions, POS device transactions, and/or one or more other types of transactions that involve one or more accounts maintained by the financial institution.

In some embodiments, the apparatus having the process flow 100 is configured to receive the transaction information based at least partially on the holder presenting account information (e.g., account number, debit card number, credit card number, credentials, passcode (e.g., primary passcode, passcode for the account with unavailable funds or credit), expiration date of debit card or credit card, name(s) of holder(s) of the account, or the like.) at the transaction machine. For example, in some embodiments, the holder presents account information at the transaction machine by swiping a debit card or credit card through the POS device. As another example, in some embodiments, the holder presents account information at the transaction machine by inputting account information into the transaction machine via a user interface associated with the transaction machine. As still another example, in some embodiments, the holder presents account information at the transaction machine by "tapping" an NFC-enabled mobile device at an NFC-enabled transaction machine (e.g., holding the NFC interface of the mobile device within approximately four inches of the NFC interface of the transaction machine, or the like.) in order to communicate the account information from the mobile device to the transaction machine.

Additionally or alternatively, the apparatus can be configured to receive the transaction information directly or indirectly from the source of the transaction. For example, in some embodiments, the apparatus is located remotely from the transaction machine but is operatively connected to the transaction machine via a network. As another example, the apparatus may include, be included in, and/or be embodied as a transaction machine. For example, in some embodiments, the apparatus having the process flow 100 includes the transaction machine referred to in block 110. As another example, in some embodiments, the apparatus having the process flow 100 is embodied as the mobile device referred to in block 130. As still another example, in some embodiments, the apparatus having the process flow 100 is embodied as a transaction machine separate from, and/or different than, the transaction machine and/or mobile device mentioned in the process flow 100.

Regarding block 120, the term "amount that exceeds available funds or credit," as used herein, generally refers to the difference between: (a) the total amount of one or more purchases, draws, payments, costs, balance transfers, financial obligations, and/or other responsibilities incurred, or that will be incurred, by an account as a result of a transaction, and (b) the amount of funds and/or credit available to the account immediately prior to the transaction. In some embodiments, the amount that exceeds the unavailable funds or credit is referred to as "surpassed available funds" if the account that exceeds available funds, or will exceed available funds, is a deposit account. For example, if a checking account has an available balance of $25 immediately before the checking account is used to pay a $50 electric bill, then the checking account will exceed available funds by $25 as a result of paying the bill. In some embodiments, the term "surpassed available funds" refers to the amount by which the balance of an account is negative. For example, if a deposit account has an available balance of −$65, then the deposit account has one or more unavailable funds exceeded totaling $65. Additionally or alternatively, in some embodiments, the term "surpassed available funds" refers to a situation where a deposit account is found to have unavailable funds to cover a transaction.

In some embodiments, the amount that exceeds the available funds or credit is referred to as "surpassed credit threshold" and/or "a surpassed credit threshold amount" if the account that exceeds the available funds or credit or will exceed available funds or credit is a credit account. For example, if a credit account has $500 in available credit immediately prior to the credit account being used to make a $600 purchase, then it will be understood that the credit account will exceed its credit threshold by $100 as a result of the purchase. Additionally or alternatively, in some embodiments, the phrase "amount that exceeds available credit" generally refers to the difference between an account balance for the credit account and a credit threshold (sometimes referred to as "credit line") associated with the credit account. For example, if a credit account has a $5,000 credit threshold and a $5,300 account balance, then it will be understood that the credit account has exceeded one or more credit threshold amounts totaling $300.

Further regarding block 120, the apparatus configured to perform the process flow 100 can be configured to make the amount that exceeds available funds determination after the transaction has been initiated and/or before the transaction is authorized and/or completed (e.g., while the transaction is pending). In addition, the apparatus can be configured to make the surpassed balance determination in any way. For example, in some embodiments, the apparatus is configured to make the surpassed balance determination by determining that the account does not have adequate funds available and/or credit to cover the transaction. In some embodiments, the apparatus having the process flow 100 includes and/or is embodied as a financial transaction processing apparatus that is configured to process financial transactions involving the account and/or the transaction machine referred to in block 110. In some of these embodiments, the apparatus is configured to make surpassed balance determinations for the account at the same time as, and/or nearly the same time as, the apparatus is processing transactions involving the account.

Additionally or alternatively, in some embodiments, the apparatus includes and/or is embodied as an authorization apparatus (e.g., the authorization apparatus 330 referred to in FIG. 3) that is configured to consider, authorize, and/or decline authorization requests and/or financial transactions. The apparatus configured to perform the process flow 100 can be configured to make surpassed balance determinations in real time and/or in substantially real time. In some embodiments, the apparatus is configured to determine the amount that exceeds the available funds immediately or nearly immediately after the surpassed balance transaction has been initiated at the transaction machine (e.g., upon the swipe of a debit or credit card through a POS device, upon the holder selecting an amount to withdraw from an ATM, or the like.). However, the apparatus having the process flow 100 can be configured to make the surpassed balance determination at any time from when the holder approaches the transaction machine to when the holder leaves the transaction machine. Additionally or alternatively, the apparatus can be configured to make the surpassed balance determination at any time from when the holder initiates and/or engages in the transaction at the transaction machine to when the transaction is completed.

Regarding block 130, in some embodiments, the transaction information referred to in block 110 includes the passcode for the account with unavailable funds or credit, such that the apparatus having the process flow 100 receives the passcode for the account with unavailable funds or credit by receiving the transaction information. For example, in some embodiments, the holder inputs the passcode for the account with unavailable funds or credit into the transaction machine at and/or near the beginning of the transaction, such that the apparatus receives the passcode for the account with unavailable funds or credit in the transaction information and/or before the apparatus makes the surpassed balance determination. In such embodiments, the holder does this so that the transaction will not be declined for unavailable funds and/or so that the holder will not need to input the passcode for the account with unavailable funds or credit later (e.g., after the transaction has been declined). However, in other embodiments, the transaction information includes the primary passcode, and the apparatus receives the passcode for the account with unavailable funds or credit after receiving the transaction information (and therefore after receiving the primary passcode). For example, in some embodiments, (a) the holder inputs the primary passcode into the transaction machine at and/or near the beginning of the transaction, such that the apparatus receives the primary passcode in the transaction information and/or before the apparatus makes the surpassed balance determination, (b) the apparatus declines the transaction as a result of making the surpassed balance determination and/or receiving the primary passcode in the transaction information, (c) the holder inputs the passcode for the account with unavailable funds or credit into the transaction machine after the transaction has been declined, and (d) the apparatus authorizes the transaction as a result of receiving the passcode for the account with unavailable funds or credit.

In some alternative embodiments (e.g., the embodiment described in connection with FIG. 2), the apparatus having the process flow 100 is configured to prompt the holder (e.g., via the transaction machine, via a mobile device accessible to the holder during the transaction, or the like.) to provide the passcode for the account with unavailable funds or credit to the apparatus having the process flow 100, where the prompting occurs after the apparatus determines that the account will exceed available funds or credit. In some of these embodiments, the apparatus receives the passcode for the account with unavailable funds or credit based at least partially on (e.g., after, in response to, or the like.) the apparatus prompting the holder. Further, in some embodiments, the apparatus is configured to prompt the holder within about twenty seconds of making the surpassed balance determination.

Further, in some alternative embodiments, the apparatus having the process flow 100 is configured to decline the transaction after making the surpassed balance determination. In some of these embodiments, the apparatus declining the transaction prompts the holder to provide the passcode for the account with unavailable funds or credit to the apparatus, such that the apparatus receives the passcode for the account with unavailable funds or credit after making the surpassed balance determination and/or after declining the transaction.

In some embodiments, the apparatus having the process flow 100 receives the passcode for the account with unavailable funds or credit based at least partially on the holder inputting the passcode for the account with unavailable funds or credit into the transaction machine referred to in block 110. Additionally or alternatively, in other embodiments, the apparatus receives the passcode for the account with unavailable funds or credit based at least partially on the holder inputting the passcode for the account with unavailable funds or credit into a mobile device accessible to the holder. In some of these embodiments, the holder carries, owns, controls, wears, and/or possesses the mobile device during the transaction (e.g., at some time after the transaction has been initiated but before the transaction is authorized and/or completed). It will be understood that, in some embodiments, by providing the passcode for the account with unavailable funds or credit to the apparatus having the process flow 100, the holder consents to the exceeding available funds or credit (e.g., consents to the amount that exceeds available funds, incurring an exceeded available funds or credit, one or more terms of a service for account with unavailable funds or credit, completing the transaction, or the like.).

Regarding block 140, the apparatus is further configured to authorize the transaction based at least partially on the apparatus receiving the passcode for the account with unavailable funds or credit. It will be understood that the apparatus can be configured to authorize the transaction in any way. For example, in some embodiments, the apparatus is configured to authorize the transaction by sending, to the transaction machine, one or more instructions to complete (and/or for completing) the transaction. In some embodiments, the apparatus is configured to authorize the transaction by approving an authorization request associated with the transaction. In some embodiments, the authorization request approved by the apparatus having the process flow 100 was included in the transaction information referred to in block 110. In some embodiments where the transaction machine referred to in block 110 is the apparatus having the process flow 100, the transaction machine authorizes and/or completes the transaction in response to receiving the holder's consent. In such embodiments, the transaction machine completes the transaction by performing one or more meaningful actions relevant to the transaction, such as, for example, dispensing cash, accepting a purchase transaction, accepting a check deposit, printing a receipt and/or statement, loading a prepaid storage card, transferring funds, and/or the like. In some embodiments, these one or more actions constitute the exchange central to the transaction, define the transaction, are desired by the holder to be performed, and/or were the reason the holder arrived at the transaction machine in the first place. Also, in some embodiments, the apparatus having the process flow 100 is configured to authorize the transaction by providing funds and/or credit available to complete the transaction (e.g., to the account, to a merchant involved in the transaction, or the like.).

Further, in some embodiments, the apparatus having the process flow 100 is configured to store the passcode for the account with unavailable funds or credit a memory device (e.g., in an account profile associated with the account) before the transaction referred to in the process flow 100 is initiated. In such embodiments, the apparatus is also configured to, after receiving the passcode for the account with unavailable funds or credit, determine the passcode for the account with unavailable funds or credit received matches the passcode for the account with unavailable funds or credit stored in the memory device. In some of these embodiments, the apparatus is configured to authorize the transaction based at least partially on the apparatus determining that the passcode for the account with unavailable funds or credit received matches the passcode for the account with unavailable funds or credit stored in the memory device.

In accordance with some embodiments, the apparatus configured to perform the process flow 100 is configured to perform the portions of the process flow 100 represented by blocks 110-140 at some point after the holder approaches the transaction machine for the transaction and before the holder leaves the transaction machine. In some embodiments, this means that the apparatus is configured to perform the one or more portions of the process flow 100 (e.g., make the surpassed balance determination, receive the passcode for the account with unavailable funds or credit, authorize the transaction, or the like.) during the transaction involving the transaction machine and the holder and/or while the holder is still at the transaction machine.

The apparatus configured to perform the process flow 100 can be configured to perform any of the portions of the process flow 100 represented by blocks 110-140 upon or after one or more triggering events (which, in some embodiments, is one or more of the other portions of the process flow 100). As used herein, a "triggering event" refers to an event that automatically (i.e., without human intervention) triggers the execution, performance, and/or implementation of a triggered action, either immediately, nearly immediately, or sometime after (e.g., within minutes, or the like.) the occurrence of the triggering event. For example, in some embodiments, the apparatus configured to perform the process flow 100 is configured such that the apparatus receiving the transaction information (the triggering event) automatically and immediately or nearly immediately (e.g., within 3-30 seconds, or the like.) triggers the apparatus to make the surpassed balance determination (the triggered action). In some embodiments, the apparatus is additionally or alternatively configured to authorize and/or complete the transaction (triggered action) automatically and immediately or nearly immediately after receiving the passcode for the account with unavailable funds or credit (triggering event).

In accordance with some embodiments, the apparatus configured to perform the process flow 100 is configured to automatically perform one or more of the portions of the process flow 100 represented by blocks 110-140, whereas in other embodiments, one or more of the portions of the process flow 100 represented by blocks 110-140 require and/or involve human intervention (e.g., a user operating the apparatus configured to perform the process flow 100, or the like.). In addition, it will be understood that, in some embodiments, the apparatus configured to perform the process flow 100 (and/or a user thereof) is configured to perform one or more portions (or combinations of portions) of the process flow 100, from start to finish, within moments, seconds, and/or minutes (e.g., within approximately 1-5 minutes from start to finish, or the like.). As an example, in some embodiments, the apparatus having the process flow 100 is configured to authorize and/or complete the transaction within moments, seconds, and/or minutes (e.g., within approximately 1-5 minutes, or the like.) of: (a) receiving the transaction information associated with the transaction; and/or (b) determining that the account will exceed available funds or credit as a result of the transaction.

As mentioned above, in some embodiments, the apparatus having the process flow 100 is configured to provide, implement, and/or is otherwise associated with a service for account with unavailable funds or credit. As used herein, the phrase "service for account with unavailable funds or credit" generally refers to a service that provides an account holder, account, and/or counterparty with the funds and/or credit necessary to complete a transaction that may cause the account to exceed available funds or credit. For example, in some embodiments, where a transaction, if completed, would cause a checking account to exceed available funds by $10, the service for account with unavailable funds or credit can provide the checking account with the $10 needed to complete the transaction. In accordance with some embodiments, the service for account with unavailable funds or credit is referred to as a surpassed available funds service if the account participating in the service is a deposit account. In other embodiments, the service for account with unavailable funds or credit in the credit account is referred to as a surpassed credit threshold service if the account participating in the service is a credit account.

In some embodiments, as required by one or more laws, rules, and/or regulations (sometimes collectively referred to herein as "surpassed balance regulations" for simplicity), the holder must opt into the service for account with unavailable funds or credit before the holder can participate in and/or otherwise use the service for account with unavailable funds or credit. It will be understood that the holder may enroll in the service for account with unavailable funds or credit at a banking center, through an electronic banking account, via a call center, and/or in some other way. In addition, in some alternative embodiments, the apparatus having the process flow 100 is configured to prompt the holder to consent to, accept, and/or agree to (collectively referred to herein as "agree to" for simplicity) one or more terms of the service for account with unavailable funds or credit. In some embodiments, the apparatus prompts the holder to agree to the one or more terms of the service for account with unavailable funds or credit by prompting the holder to "opt into" and/or otherwise enroll in the service for account with unavailable funds or credit. In some of these embodiments, the apparatus prompts the holder during the transaction.

It will be understood that the service for account with unavailable funds or credit includes one or more terms, which define the one or more rights, responsibilities, privileges, payments, features, and/or obligations of the service for account with unavailable funds or credit. For example, in some embodiments, the one or more terms of the service for account with unavailable funds or credit describe how the service for account with unavailable funds or credit works; identify the service provider for account with unavailable funds or credit; define what constitutes exceeding available funds and credit; identify the one or more exceeded available funds or credit payments assessed for enrolling in the service for account with unavailable funds or credit, for participating in the service for account with unavailable funds or credit, and/or for engaging in a surpassed balance transaction; and/or the like. As another example, in some embodiments, the one or more terms of the service for account with unavailable funds or credit requires that the holder use the passcode for the account with unavailable funds or credit in order to participate in the service for account with unavailable funds or credit.

In some embodiments, the service for account with unavailable funds or credit is provided by a financial institution, such as a bank, and is funded by that financial institution (and not by an account held by and/or otherwise associated with the holder). For example, in some embodiments, the service for account with unavailable funds or credit is provided by the same financial institution that maintains the transaction machine, the apparatus configured to perform the process flow 100, and/or the account that exceeds, or will exceed, the available funds or credit. It will be understood that, in some embodiments, the service for account with unavailable funds or credit (and/or the service provider who deals with unavailable funds or credit) is regulated in the United States by the Electronic Funds Transfer Act, also known as Federal Reserve Board Regulation E (hereinafter "Regulation E"). In other embodiments, the service for account with unavailable funds or credit (and/or service provider that deals with unavailable funds or credit) is regulated in the United States by the Credit Card Accountability Responsibility and Disclosure Act of 2009, which is codified in the United States as Public Law No. 111-24 (sometimes referred to herein, for simplicity, as the "Credit CARD Act of 2009" or the "CARD Act"). In some embodiments, the service for account with unavailable funds or credit does not contractually obligate the service provider that deals with unavailable funds or credit to cover amount that exceeded the available funds or credit. In other words, in such embodiments, the service provider that deals with unavailable funds or credit account may choose to cover surpassed available funds and/or surpassed credit threshold and/or transactions that may cause the account to exceed credit at its discretion. However, in other embodiments, the service provider that deals with unavailable funds or credit is contractually obligated and/or otherwise required to cover the amount that exceeds the available funds or credit.

In some embodiments, one or more portions of the process flow 100 may be configured to comply with one or more portions of surpassed balance regulation. For example, in some embodiments, receiving passcode for the account with unavailable funds or credit, as represented by block 130, may comply with one or more consent, opt-in, and/or revocation requirements of surpassed balance regulation. As another example, in some alternative embodiments, the apparatus is configured to send the holder a confirmation message that indicates that the holder consented to the surpassed balance by providing the passcode for the account with unavailable funds or credit, and in some embodiments, this confirmation message may comply with one or more confirmation requirements of surpassed balance regulation.

It will be understood that the apparatus having the process flow 100 can be configured to perform one or more portions of any embodiment described and/or contemplated herein, such as, for example, one or more portions of the process flow 200 described herein and/or one or more portions of the process flows described in connection with FIGS. 4 and/or 5. Also, the number, order, and/or content of the portions of the process flow 100 are exemplary and may vary. For example, in some embodiments, the apparatus having the process flow 100 is configured to assess a payment associated with the surpassed credit threshold (e.g., assess an exceeded the available funds or credit payment to the account and/or to the holder, or the like.), where the payment is based at least partially on the account exceeding the available funds or credit, on the account using the service for account with unavailable funds or credit, on the amount of the surpassed credit threshold, and/or on authorizing and/or completing the transaction. In some embodiments, the apparatus is configured to: (a) assess the account an exceeded available funds or credit payment based at least partially on the apparatus determining that the account settled below balance at the end of the day in which the transaction occurred; and/or (b) determine not to assess the account an exceeded available funds or credit payment based at least partially on the apparatus determining that the account settled non-negative (e.g., the account has a zero or positive available balance, or the like.) at the end of the day in which the transaction occurred.

As another example, in some embodiments, the apparatus is configured to determine whether the passcode for the account with unavailable funds or credit has been received in order to determine whether the holder has consented to the amount that exceeds the available funds or credit. In some of these embodiments, the apparatus is configured to store (e.g., in a datastore) the holder's consent to the amount that exceeds the available funds or credit (and/or evidence that the holder provided the passcode for the account with unavailable funds or credit), which may, in some embodiments, be required by one or more regulations pertaining to exceeded available funds or credit. As a further example, in some embodiments, the apparatus (and/or the transaction machine referred to in block 110) is configured to authenticate the holder as a condition of receiving the passcode for the account with unavailable funds or credit and/or providing service for unavailable funds or credit. In some embodiments, the apparatus (and/or transaction machine) is configured to authenticate the holder based at least partially on account information (e.g., ATM/debit/credit card, account number, username, passcode, biometric information, barcode, or the like.) the holder inserts, provides, and/or presents (collectively referred to herein as "presents" for simplicity) to the transaction machine and/or to the apparatus having the process flow 100.

As a further example of an additional or alternative portion, in some embodiments, the apparatus having the process flow 100 is configured to generate and/or send disclosure information to the holder (i.e., in addition to any disclosure information referred to in the process flow 100) before the surpassed balance transaction is initiated, before the holder approaches the transaction machine, before the apparatus receives the transaction information, and/or before the apparatus receives the passcode for the account with unavailable funds or credit. For example, in some embodiments, before the apparatus receives the transaction information, the apparatus is configured to generate and/or send disclosure information to the holder that defines one or more terms of a service for unavailable funds credit. This disclosure information can be sent via one or more emails, telephone calls, text messages, instant messages, IVR communications, communications specific to one or more social media networks and/or applications, direct mailings, electronic banking account-specific messages, and/or the like. In some embodiments, the disclosure information is included in one or more communications typically sent to a holder, such as, for example, a periodic (e.g., monthly) account statement. In other embodiments, instead of sending the disclosure information before the surpassed balance transaction is initiated, the apparatus having the process flow 100 is configured to the send the disclosure information to the holder during the transaction (e.g., via the holder's mobile device and/or the transaction machine, or the like.), so that the holder can review and consent to the one or more terms of the service for unavailable funds or credit during the transaction and/or while the holder is at the transaction machine. In some of these embodiments, the holder can enroll in the service for unavailable funds or credit at the transaction machine, after the surpassed balance transaction has been initiated, and/or before the surpassed balance transaction has been completed. In some embodiments, sending the disclosure information to the holder may help a financial institution comply with one or more requirements of an regulations pertaining to exceeded available funds or credit.

Referring now to FIG. 2, a more-detailed process flow 200 is illustrated for providing a service for account with unavailable funds or credit using an PIN for the account with unavailable funds, in accordance with an embodiment of the present invention. It will be understood that the process flow 200 illustrated in FIG. 2 represents an example embodiment of the process flow 100 described in connection with FIG. 1. In accordance with some embodiments, one or more portions of the process flow 200 are performed by an apparatus having hardware and/or software configured to perform one or more portions of the process flow 200. For example, in some embodiments, one or more portions of the process flow 200 are performed, individually or collectively, by the transaction machine 320 described in connection with FIG. 3, the authorization apparatus 330, the mobile device 340, and/or by any one or more portions (e.g., applications, or the like.) thereof. Also, the apparatus having the process flow 200 may include, be included in, be embodied as, and/or be operatively connected to the transaction machine referred to in the process flow 200. In accordance with some embodiments, the apparatus having the process flow 200 is maintained by a bank for the benefit of its customers. Also in accordance with some embodiments, the customer referred to in the process flow 200 is the user of the transaction machine and a customer of the bank. In addition, the account referred to in the process flow 200 is an account held by the customer and maintained by the bank.

As represented by block 205, the bank customer enrolls in a service for account with unavailable funds or credit provided by the bank, such as, for example, by mail, banking center, call center, online banking, mobile banking application, and/or the like. During enrollment and/or as a result of enrolling, the apparatus having the process flow 200 assigns (and/or the customer selects) a PIN for the account for unavailable funds for use in future surpassed balance transactions, as represented by block 210. For example, in some embodiments, the customer selects a PIN for the account with unavailable funds that is easy to remember and/or similar to the primary PIN already associated with the customer, the customer's account, and/or the customer's debit and/or credit card (e.g., the customer selects "1227" as the PIN for the account with unavailable funds because the primary PIN is "1226"). After the PIN for the account with unavailable funds is selected by or assigned to the customer and/or account, the apparatus having the process flow 200 stores the PIN for the account with unavailable funds in a datastore (e.g., the account datastore 338, or the like.), as represented by block 215. In some embodiments, the PIN for the account with unavailable funds is stored in an account profile associated with the account, where the account profile and many other account profiles are stored in the datastore.

Sometime after the customer enrolls in the service for account with unavailable funds or credit, the customer approaches a transaction machine (e.g., POS device, ATM, personal computer, or the like.) for the purpose of engaging in a transaction using the transaction machine, as represented by block 220. Thereafter, the customer presents account information and inputs the primary PIN at the transaction machine, as represented by block 225. For example, in some embodiments where the transaction machine is a POS device, the customer swipes a debit and/or credit card associated with the customer's account through the POS device in order to communicate account information (e.g., information associated with the customer, the account, the debit and/or credit card, or the like.) to the POS device and/or to the apparatus having the process flow 200. In such embodiments, the customer also inputs, into a user interface of the POS device, the primary PIN that is associated with the debit and/or credit card (and/or the account) and that is required to engage in transactions using the debit and/or credit card (and/or account). As another example, in some embodiments where the transaction machine is a personal computer, the customer inputs a credit card number and the primary PIN for the credit card (and/or account) into a field of a web page, where the web page is associated with the transaction and is displayed at the personal computer.

After the customer presents the account information and the primary PIN at the transaction machine, the apparatus having the process flow 200 (and/or the transaction machine) identifies and/or authenticates the customer, as represented by block 230. In some embodiments, the customer is identified and/or authenticated based at least partially on the account information and/or the primary PIN presented by the customer at the transaction machine. After being identified and/or authenticated, the customer selects the transaction and/or agrees to the transaction amount, as represented by block 235. Then, as represented by block 240, the transaction machine sends an authorization request to the apparatus having the process flow 200, where the authorization request identifies and/or describes the transaction, the customer, the account, the debit and/or credit card, the account information, the primary PIN, and/or the like.

Upon receiving the authorization request, the apparatus having the process flow 200 determines that the customer's account will exceed available funds or credit as a result of the transaction (e.g., the account has unavailable funds and/or credit to cover the transaction, or the like.), as represented by block 245. Thereafter, the apparatus is configured to decline the authorization request and/or otherwise decline, cancel, abort, and/or reject the transaction, as represented by block 250.

In addition, as represented by block 255, the apparatus having the process flow 200 is configured to prompt the customer to input the PIN for the account with unavailable funds at the transaction machine. The customer may be prompted in any way. For example, in some embodiments, the apparatus having the process flow 200 is configured to prompt the customer by sending a message to the transaction machine referred to in block 220 and/or to a mobile device accessible to (e.g., carried by, controlled by, or the like.) the customer during the transaction, where the message prompts the customer to input the PIN for the account with unavailable funds into the transaction machine. The message may be any number and/or type of communication(s). For example, the message sent may be one or more text messages, phone calls, emails, actionable alerts, audible outputs, mobile banking application-specific messages, social media-specific messages, and/or the like. The message may be generated, rendered, displayed, and/or otherwise output visually (e.g., via a display) and/or audibly (e.g., via a speaker). In addition, the message may include any amount and/or type of information. For example, in some embodiments, the message includes explicit instructions for the holder to input the PIN for the account with unavailable funds into the transaction machine (e.g., "You have engaged in a transaction at Store A that will cause your checking account to exceed available funds or credit. Please input your PIN for the account with unavailable funds into the POS device at Store A if you agree to cause your account to exceed available funds in order to complete the transaction"). Additionally or alternatively, the message may implicitly prompt the customer to input the PIN for the account with unavailable funds by notifying the customer of the amount that exceeds the available funds or credit, a payment associated with the amount that exceeds the available funds or credit, one or more terms of the service for account with unavailable funds or credit, and/or the like.

In some embodiments, the apparatus is configured to send the message and/or otherwise prompt the customer within about fourteen (14) seconds of: (a) declining the authorization request; (b) determining that the account will exceed available funds or credit; (c) receiving the authorization request; and/or (d) the transaction machine sending the authorization request. Further, in some embodiments, in addition to prompting the customer to input the PIN for the account with unavailable funds, the apparatus having the process flow 200 is configured to prompt the customer to re-present the account information (e.g., re-swipe the debit and/or credit card) referred to in connection with block 225. In some embodiments, the customer is sent a message that explicitly instructs the customer to re-present the account information, and in some embodiments, this message is the same message that prompts the customer to input the PIN for the credit account with unavailable funds.

In some alternative embodiments, instead of the customer selecting or being assigned the PIN for the account with unavailable funds during the enrollment process, the customer is first provided the PIN for the account with unavailable funds via the prompting represented by block 255 and/or at some point after initiating the surpassed balance transaction. For example, in some alternative embodiments, the apparatus having the process flow 200 is configured to send a message to the customer after the apparatus determines that the account will exceed available funds or credit, where the message: (a) notifies the customer of the amount that exceeds the available funds or credit, a payment associated with the amount that exceeds the available funds or credit, one or more terms associated with a service for account with unavailable funds or credit, or the like.; (b) provides the customer with the PIN for the account with unavailable funds for use in completing the surpassed balance transaction ; and/or (c) prompts the customer to input the PIN for the account with unavailable funds into the transaction machine (and/or re-present the account information) if the customer wishes to complete the surpassed balance transaction and/or to incur the exceeded available funds or credit payment. In some embodiments, the PIN for the account with unavailable funds that is provided to the customer after the surpassed balance transaction has been initiated is a dynamically-generated and/or one-time PIN for the account with unavailable funds, and/or is valid for only one surpassed balance transaction and/or for only the surpassed balance transaction referred to in the process flow 200.

Referring again to FIG. 2, after being prompted, the customer inputs the PIN for the account with unavailable funds into the transaction machine and/or re-presents the account information (and/or presents other account information) to the transaction machine, as represented by block 260. For example, in some embodiments where the transaction machine is a POS device, the customer can re-swipe his debit and/or credit card through POS device and/or input the PIN for the account with unavailable funds into a keypad of the transaction machine in order to re-initiate and/or complete the surpassed balance transaction. In some embodiments, by inputting the PIN for the account with unavailable funds into the transaction machine, the customer may consent, either explicitly or implicitly, to one or more terms of a service for account with unavailable funds or credit, to incurring an exceeded available funds or credit payment associated with the amount that exceeds the available funds or credit, to completing the surpassed balance transaction, and/or the like. Also, it will be understood that the customer may input his PIN for the account with unavailable funds into the transaction machine in any way (e.g., using a keypad, microphone, touchscreen display, or the like.).

It will be understood that, in this example embodiment, the apparatus having the process flow 200 is configured to prompt the customer during the transaction (e.g., while the holder is still at and/or near the transaction machine). As such, the customer may decline the amount that exceeds the available funds or credit coverage (e.g., by declining to input the PIN for the account with unavailable funds) because, for example, the transaction involves a relatively small and/or discretionary purchase. However, in other cases, the customer may accept the amount that exceeds the available funds or credit coverage because the transaction involves a relatively large and/or an emergency and/or non-discretionary purchase. Either way, the customer is empowered with making this decision, which reduces or eliminates the possibility that the customer will unknowingly or unexpectedly engage in a transaction that may cause the account to exceed available funds (and/or unknowingly or unexpectedly incur an exceeded available payment). In addition, because the apparatus prompts the customer during the transaction, the customer is able to make this decision in real-time and/or on a per-transaction basis. Further, the apparatus may also enable the customer to make this decision discreetly (e.g., by prompting the customer via the customer's mobile phone), thereby avoiding any embarrassment associated with the amount that exceeds the available funds or credit, the exceeded available funds or credit payment, the service for account with unavailable funds or credit, and/or the like.

After the customer inputs the PIN for the account with unavailable funds and/or re-presents the account information, the transaction machine sends a second authorization request to the apparatus having the process flow 200, where the second authorization request identifies and/or describes the transaction, the customer, the account, the debit and/or credit card, the account information, the primary PIN, the PIN for the account with unavailable funds, and/or the like, as represented by block 265. In some embodiments, the information sent in the second authorization request is similar and/or identical to the information sent in the first authorization request referred to in connection with block 240, except that the second authorization request includes the PIN for the account with unavailable funds and the first authorization request does not.

After receiving the second authorization request, the apparatus determines that the PIN for the account with unavailable funds sent in the second authorization request matches the PIN for the account with unavailable funds stored in the datastore, as represented by block 270. For example, in some embodiments, the apparatus is configured to compare the PIN for the account with unavailable funds sent in the second authorization request to a PIN for the account with unavailable funds that is stored in the account profile associated with the account. If the two PINS associated with the account with unavailable funds match, the apparatus having the process flow 200 is configured to approve the second (and/or first) authorization request, authorize the surpassed balance transaction, and/or instruct the transaction machine to complete the surpassed balance transaction, as represented by block 275. Thereafter, the transaction machine completes the surpassed balance transaction (e.g., by dispensing cash, completing a credit card payment, or the like), as represented by block 280. After the surpassed balance transaction is completed, the customer leaves the transaction machine, as represented by block 285.

In accordance with some embodiments, one or more portions of the process flow 200 may comply with one or more requirements of an amount that exceeds the available funds or credit regulation (e.g., Regulation E and/or the CARD Act in the United States, or the like.). For example, in some embodiments, receiving the customer's PIN for the account with unavailable funds at the transaction machine, as represented by block 260 may comply with one or more consent requirements of an amount that exceeds the available funds or credit regulation because, in some embodiments, the customer may consent to the amount that exceeds the available funds or credit, the exceeded available funds or credit payment, the surpassed balance transaction, and/or one or more terms of a service for account with unavailable funds or credit by inputting the PIN for the account with unavailable funds into the transaction machine. In addition, in some embodiments, the apparatus completing the surpassed balance transaction may comply with one or more regulation requirements pertaining to exceeded available funds or credit because, for example, the customer inputted the PIN for the account with unavailable funds and was authenticated, all before the surpassed balance transaction was completed.

Of course, it will also be understood that the embodiment illustrated in FIG. 2 is merely exemplary and that other embodiments may vary without departing from the scope and spirit of the present invention. For example, in some alternative embodiments, the primary and PIN for the account with unavailable funds s referred to in the process flow 200 are passwords, usernames, strings, and/or some other type of passcode. As another example, in some alternative embodiments, the apparatus may receive the PIN for the account with unavailable funds as a result of the customer inputting the PIN for the account with unavailable funds into a mobile device (e.g., mobile phone) carried by and/or accessible to the customer during the transaction. In some embodiments, the apparatus is additionally or alternatively configured to prompt the customer to input the PIN for the account with unavailable funds into the mobile device. As another example, in some alternative embodiments, the apparatus having the process flow 200 approves the first authorization request at block 275 because a second authorization request is never sent and/or is not required. In other words, the apparatus can be configured to hold the original authorization request until the PIN for the account with unavailable funds is received and the transaction is authorized, or until a predetermined period of time has elapsed.

As another example, in some alternative embodiments, the portion of the process flow 200 represented by block 255 is omitted. In other words, in such embodiments, the customer is not explicitly prompted to input the PIN for the account with unavailable funds at the transaction machine after the surpassed balance transaction is declined; instead, the customer just knows, after and/or as a result of being declined, to input the PIN for the account with unavailable fundsand/or re-present the account information at the transaction machine in order to complete the surpassed balance transaction. In some of these embodiments, the customer is prompted to input the PIN for the account with unavailable funds based at least partially on the transaction being declined (e.g., the declining the transaction implicitly prompts the customer to input the PIN for the account with unavailable funds).

In addition, in some alternative embodiments, before the apparatus compares the two PINS, the apparatus may first determine, based at least partially on the second transaction request and/or the information therein, that the account will exceed available funds or credit as a result of the transaction. In other words, in some embodiments, the apparatus may be configured to treat and/or otherwise process the second authorization request as if it were a new authorization request. In such embodiments, the apparatus may be configured to regularly access the datastore to determine whether the PIN sent in the authorization request matches the PIN for the account with unavailable funds that is stored in the datastore and associated with the account.

In addition, it will also be understood that the apparatus having the process flow 200 can be configured to perform one or more portions of the process flow 200 in real time, in substantially real time, and/or at one or more predetermined times. The apparatus having the process flow 200 may be configured to perform any of the portions of the process flow 200 represented by blocks 205-280 upon or after one or more triggering events (which, in some embodiments, is the performance of one or more of the other portions of the process flow 200). In addition, in some embodiments, the apparatus having the process flow 200 (and/or a customer thereof) is configured to perform one or more portions (or combinations of portions) of the process flow 200, from start to finish, within moments, seconds, and/or minutes (e.g., within approximately 1-15 minutes, or the like.).

Referring now to FIG. 3, a system 300 for providing a service for account with unavailable funds or credit using a passcode for the account with unavailable funds or credit is provided, in accordance with an embodiment of the present invention. As illustrated, the system 300 includes a network 310, a transaction machine 320, an authorization apparatus 330, and a mobile device 340. FIG. 3 also shows an account holder 302 and a profile 308 of an account (e.g., account, savings account, credit card account, LOC account, HELOC account, or the like.), where the profile 308 is stored in the account datastore 338 of the authorization apparatus 330. The account is held by the holder 302, maintained by a financial institution at which the holder 302 is a customer, and is associated with the account profile 308. As shown, the account profile 308 includes account information 308A associated with the account (and/or holder 302), a primary passcode 308B associated with the account (and/or holder 302), and a passcode for the account with unavailable funds or credit 308C associated with the account (and/or holder 302). In some embodiments, the holder 302 may access the account profile 308 via online banking, mobile banking, and/or text banking (e.g., by using the mobile device 340, the transaction machine 320, and/or some other apparatus). Also, as shown, the holder 302 has access to the mobile device 340 and the transaction machine 320. In accordance with some embodiments, the transaction machine 320 and the authorization apparatus 330 are each maintained by the same financial institution. For example, in some embodiments, the holder 302 is a customer of the financial institution, the authorization apparatus 330 is embodied as an ATM transaction server maintained by the financial institution, and the transaction machine 320 is embodied as an ATM maintained by the financial institution. However, in other embodiments, the transaction machine 320 and the authorization apparatus 330 are maintained by separate entities. For example, in some embodiments, the transaction machine 320 is embodied as a POS device maintained by a merchant, and the authorization apparatus 330 is embodied as an authorization server maintained by a financial institution. In accordance with some embodiments, the mobile device 340 is associated with the holder 302 and/or is carried, owned, possessed, and/or owned by the holder 302.

As shown in FIG. 3, the transaction machine 320, the authorization apparatus 330, and the mobile device 340 are each operatively and selectively connected to the network 310, which may include one or more separate networks. The network 310 may include one or more payment networks (e.g., interbank networks, any wired and/or wireless network over which payment information is sent, or the like.), telephone networks (e.g., cellular networks, CDMA networks, any wired and/or wireless network over which communications to telephones and/or mobile phones are sent, or the like.), local area networks (LANs), wide area networks (WANs), global area networks (GANs) (e.g., the Internet, or the like.), and/or one or more other telecommunications networks. For example, in some embodiments, the network 310 includes a telephone network (e.g., for communicating with the mobile device 340, or the like.) and a payment network (e.g., for communicating with the transaction machine 320, or the like.). It will also be understood that the network 310 may be secure and/or unsecure and may also include wireless and/or wired technology.

The transaction machine 320 may include any computerized apparatus that can be configured to perform any one or more of the functions of the transaction machine 320 described and/or contemplated herein. It will also be understood that the transaction machine 320 can include and/or be embodied as, any transaction machine described and/or contemplated herein. It will further be understood that the transaction machine 320 can initiate, perform, complete, and/or otherwise facilitate any transaction described and/or contemplated herein as being initiated, performed, and/or otherwise facilitated by a transaction machine. For example, in some embodiments, the transaction machine 320 includes and/or is embodied as an ATM, a POS device, a self-checkout machine, a vending machine, a ticketing kiosk, a personal computer, a gaming device, a mobile phone, and/or the like. As another example, in some embodiments, the transaction machine 320 is configured to initiate, perform, complete, and/or otherwise facilitate one or more financial and/or non-financial transactions, including, for example, purchasing, renting, selling, and/or leasing goods and/or services (e.g., groceries, stamps, tickets, gift certificates, DVDs, or the like.); withdrawing cash; making deposits (e.g., cash, checks, or the like.); making payments (e.g., paying telephone bills, sending remittances, or the like.); accessing and/or navigating the Internet; and/or the like.

In some embodiments, the transaction machine 320 (and/or one or more other portions of the system 300) requires its users to authenticate themselves to the transaction machine 320 (and/or one or more other portions of the system 300) before the transaction machine 320 will initiate, perform, complete, and/or facilitate a transaction. For example, in some embodiments, the transaction machine 320 (and/or the transaction application 327) is configured to authenticate a transaction machine user based at least partially on an ATM/debit/credit card, loyalty/rewards/club card, smart card, token (e.g., USB token, or the like.), username/password, PIN, biometric information, and/or one or more other credentials that the user presents to the transaction machine 320. Additionally or alternatively, in some embodiments, the transaction machine 320 is configured to authenticate a user by using one-, two-, or multi-factor authentication. For example, in some embodiments, the transaction machine 320 requires two-factor authentication, such that the holder 302 must provide a valid debit card and enter the correct PIN for the debit card in order to authenticate the holder 302 to the transaction machine 320.

As illustrated in FIG. 3, in accordance with some embodiments of the present invention, the transaction machine 320 includes a communication interface 322, a processor 324, a memory 326 having a transaction application 327 stored therein, and a user interface 329. In such embodiments, the processor 324 is operatively and selectively connected to the communication interface 322, the user interface 329, and the memory 326.

Each communication interface described herein, including the communication interface 322, generally includes hardware, and, in some instances, software, that enables a portion of the system 300, such as the transaction machine 320, to send, receive, and/or otherwise communicate information to and/or from the communication interface of one or more other portions of the system 300. For example, the communication interface 322 of the transaction machine 320 may include a modem, network interface controller (NIC), NFC interface, network adapter, network interface card, and/or some other electronic communication device that operatively connects the transaction machine 320 to another portion of the system 300, such as, for example, the authorization apparatus 330.

Each processor described herein, including the processor 324, generally includes circuitry for implementing the audio, visual, and/or logic functions of that portion of the system 300. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the transaction application 327 of the memory 326 of the transaction machine 320.

Each memory device described herein, including the memory 326 for storing the transaction application 327 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 3, the memory 326 includes the transaction application 327. It will be understood that the transaction application 327 can be operable (e.g., usable, executable, or the like.) to initiate, perform, complete, and/or facilitate one or more portions of any embodiment described and/or contemplated herein, such as, for example, one or more portions of the process flows 100 and/or 200 described herein and/or one or more portions of the process flows described in connection with FIGS. 4 and/or 5. For example, in some embodiments, the transaction application 327 is operable to receive transaction information associated with a transaction. As another example, in some embodiments, the transaction application 327 is operable to determine, based at least partially on that transaction information, that an account (e.g., the account held by the holder 302, or the like.) will exceed available funds or credit as a result of a transaction. In some embodiments, the transaction application 327 is operable to receive a passcode for the account with unavailable funds or credit (e.g., the passcode for the account with unavailable funds or credit 308C) associated with the account, and/or authorize a transaction based at least partially on receiving the amount that exceeds the available funds or credit passcode. In still other embodiments, the transaction application 327 is operable to complete one or more transactions at the transaction machine 320 (e.g., complete a purchase transaction, dispense cash, accept a check for deposit, or the like.). As a further example, in some embodiments, the transaction application 327 is operable to prompt the holder 302 to input a passcode (e.g., the primary passcode 308B, the passcode for the account with unavailable funds or credit 308C) into the transaction machine (e.g., into the user interface 329). In still other embodiments, the transaction application 327 is operable to generate and/or send authorization requests associated with one or more transactions to the authorization apparatus 330.

In some embodiments, where the transaction machine 320 includes and/or is embodied as an ATM, the transaction application 327 is configured to execute on the ATM in order to initiate, perform, complete, and/or facilitate, for example, one or more cash withdrawals, deposits, and/or the like. In other embodiments, where the transaction machine 320 includes and/or is embodied as a POS device, the transaction application 327 is configured to execute on the POS device in order to initiate, perform, complete, and/or facilitate, for example, one or more debit card and/or credit card transactions. In still other embodiments, where the transaction machine 320 includes and/or is embodied as a personal computer, the transaction application 327 is configured to execute on the personal computer, and, in some embodiments, the transaction application 327 is embodied as a web browser (i.e., for navigating the Internet, or the like.) that is operable to initiate, perform, complete, and/or otherwise facilitate one or more financial and/or non-financial transactions.

In some embodiments, the transaction application 327 is operable to enable the holder 302 and/or transaction machine 320 to communicate with one or more other portions of the system 300, and/or vice versa. In some embodiments, the transaction application 327 is additionally or alternatively operable to initiate, perform, complete, and/or otherwise facilitate one or more financial and/or non-financial transactions. In some embodiments, the transaction application 327 includes one or more computer-executable program code portions for causing and/or instructing the processor 324 to perform one or more of the functions of the transaction application 327 and/or transaction machine 320 described and/or contemplated herein. In some embodiments, the transaction application 327 includes and/or uses one or more network and/or system communication protocols.

As shown in FIG. 3, the transaction machine 320 also includes the user interface 329. It will be understood that the user interface 329 (and any other user interface described and/or contemplated herein) can include and/or be embodied as one or more user interfaces. It will also be understood that, in some embodiments, the user interface 329 includes one or more user output devices for presenting information and/or one or more items to the transaction machine user (e.g., the holder 302, or the like.), such as, for example, one or more displays, speakers, receipt printers, dispensers (e.g., cash dispensers, ticket dispensers, merchandise dispensers, or the like.), and/or the like. In some embodiments, the user interface 329 additionally or alternatively includes one or more user input devices, such as, for example, one or more buttons, keys, dials, levers, directional pads, joysticks, keyboards, keypads, mouses, accelerometers, controllers, microphones, touchpads, touchscreens, haptic interfaces, styluses, scanners, biometric readers, motion detectors, cameras, card readers (e.g., for reading the magnetic strip on magnetic cards such as ATM, debit, credit, and/or bank cards, or the like.), deposit mechanisms (e.g., for depositing checks and/or cash, or the like.), and/or the like for receiving information from one or more items and/or from the transaction machine user (e.g., the holder 302, or the like.). In some embodiments, the user interface 329 and/or the transaction machine 320 includes one or more vaults, security sensors, locks, and/or anything else typically included in and/or near the transaction machine.

FIG. 3 also illustrates an authorization apparatus 330, in accordance with an embodiment of the present invention. The authorization apparatus 330 may include any computerized apparatus that can be configured to perform any one or more of the functions of the authorization apparatus 330 described and/or contemplated herein. It will also be understood that the authorization apparatus 330 can include and/or be embodied as any authorization apparatus described and/or contemplated herein. It will further be understood that the authorization apparatus 330 can initiate, perform, complete, and/or otherwise facilitate any transaction described and/or contemplated herein as being initiated, performed, and/or otherwise facilitated by an authorization apparatus. In some embodiments, the authorization apparatus 330 includes and/or is embodied as one or more servers, engines, mainframes, personal computers, ATMs, network devices, front end systems, back end systems, and/or the like. In some embodiments, such as the one illustrated in FIG. 3, the authorization apparatus 330 includes a communication interface 332, a processor 334, and a memory 336, which includes an authorization application 337 and an account datastore 338 stored therein. As shown, the communication interface 332 is operatively and selectively connected to the processor 334, which is operatively and selectively connected to the memory 336.

The authorization application 337 can be operable (e.g., usable, executable, or the like.) to initiate, perform, complete, and/or facilitate any one or more portions of the process flows 100 and/or 200 described herein and/or one or more portions of the process flows described in connection with FIGS. 4 and/or 5. For example, in some embodiments, the authorization application 337 is operable to receive transaction information associated with a transaction. As another example, in some embodiments, the authorization application 337 is operable to determine, based at least partially on that transaction information, that an account (e.g., the account, or the like.) will exceed available funds or credit as a result of a transaction. In some embodiments, the authorization application 337 is operable to receive a passcode for the account with unavailable funds or credit (e.g., the passcode for the account with unavailable funds or credit 308C) associated with the account, and/or authorize a transaction based at least partially on receiving the passcode for the account with unavailable funds or credit.

As another example, in some embodiments, the transaction application 327 is operable to prompt the holder 302 to input a passcode (e.g., the primary passcode 308B, the passcode for the account with unavailable funds or credit 308C) into the transaction machine (e.g., into the user interface 329) and/or the mobile device 340. In some of these embodiments, the authorization application 337 prompts the holder 302 via the user interface 329 of the transaction machine 320 and/or via the user interface 349 of the mobile device 340. In some embodiments, the authorization application 337 receiving the passcode for the account with unavailable funds or credit from the holder 302 serves to indicate that the holder 302 consents to incurring an amount that exceeds the available funds or credit, to incurring an exceeded available funds or credit payment, to completing a surpassed balance transaction, and/or to one or more terms of a service for account with unavailable funds or credit. Also, in some embodiments, the authorization application 337 is operable to receive the primary passcode and/or passcode for the account with unavailable funds or credit from the holder 302 via the mobile device 340 and/or via the transaction machine 320.

As another example, in some embodiments, the authorization application 337 is operable to generate and/or send disclosure information to the holder 302, where the disclosure information defines one or more terms of a service for account with unavailable funds or credit. In some embodiments, the authorization application 337 generates and/or sends this disclosure information to the holder 302 prior to the holder 302 initiating and/or engaging in a transaction at the transaction machine 320. However, in other embodiments, the authorization application 337 is operable to send the disclosure information to the holder 302 during the surpassed balance transaction and/or while the holder 302 is standing at the transaction machine 320. Also, in some embodiments, the authorization application 337 is further operable to prompt the holder 302 (e.g., via the user interface 329, via the user interface 349, during the surpassed balance transaction, or the like.) to agree to the one or more terms of the service for account with unavailable funds or credit defined in the disclosure information. In some embodiments, the authorization application 337 is operable to send a confirmation message to the holder 302 that confirms receipt of the holder's passcode for the account with unavailable funds or credit and/or that confirms the holder's consent to the amount that exceeds the available funds or credit and/or to completing the transaction. In some embodiments, the authorization application 337 is operable to perform one or more of these (and/or other) functions, such that a financial institution may comply with one or more amount that exceeds the available funds or credit regulation requirements (e.g., Regulation E in the United States, or the like.).

In some embodiments, the authorization application 337 is operable to enable the authorization apparatus 330 to communicate with one or more other portions of the system 300, such as, for example, the account datastore 338, the mobile device 340, and/or the transaction machine 320, and/or vice versa. In addition, in some embodiments, the authorization application 337 is operable to initiate, perform, complete, and/or otherwise facilitate one or more financial and/or non-financial transactions. In some embodiments, the authorization application 337 includes one or more computer-executable program code portions for causing and/or instructing the processor 334 to perform one or more of the functions of the authorization application 337 and/or the authorization apparatus 330 that are described and/or contemplated herein. In some embodiments, the authorization application 337 includes and/or uses one or more network and/or system communication protocols.

In addition to the authorization application 337, the memory 336 also includes the account datastore 338. As shown, the account datastore 338 stores the account profile 308, which includes account information 308A, the primary passcode 308B, and the passcode for the account with unavailable funds or credit 308C. The account information 308A may include any information associated with the account held by the holder 302, including, for example, information associated with one or more account holders (e.g., holder 302), transaction histories, when the account last used a service for account with unavailable funds or credit, account preferences, billing information, the terms and conditions associated with the account, and/or the like. The primary passcode 308B may include any information associated with a primary passcode, such as, for example, the primary passcode itself (e.g., "3578," "235145," "chiefs," or the like.), when the primary passcode was selected by the holder 302 or assigned by the financial institution maintaining the account and/or providing the service for account with unavailable funds or credit, when the primary passcode was last used, or the like. The passcode for the account with unavailable funds or credit 308C may include any information associated with a passcode for the account with unavailable funds or credit, including, for example, the passcode for the account with unavailable funds or credit itself (e.g., "4598," "12345," "exceededfunds123," or the like.), when the passcode for the account with unavailable funds or credit was selected by the holder 302 or assigned by the financial institution maintaining the amount and/or providing the service for account with unavailable funds or credit, when the passcode for the account with unavailable funds or credit was last used, any one or more conditions associated with using the passcode for the account with unavailable funds or credit (e.g., the passcode for the account with unavailable funds or credit may be used to complete ATM transactions but not POS device transactions, to consent to amount that exceeds the available funds or credit of $45 or more, or the like.).

It will be understood that the account datastore 338 can be configured to store any type and/or amount of information. In addition to the account profile 308, the account datastore 338 may include information associated with one or more account holders (e.g., the holder 302, account holders other than the holder 302), account profiles (i.e., other than the account profile 308), financial accounts (i.e., other than the account held by the holder 302), transaction machines, transaction machine users, transactions, amount that exceed available funds or credit, electronic banking accounts, primary passcodes, passcodes associated with the account with unavailable funds, mobile devices, service for account with unavailable funds or credits, authorization requests, regulations pertaining to exceeded available funds or credit, and/or the like. In some embodiments, the account datastore 338 may also store any information related to providing a service for account with unavailable funds or credit using a passcode for the account with unavailable funds or credit. In some embodiments, the account datastore 338 additionally or alternatively stores information associated with electronic banking (e.g., online banking, mobile banking, text banking, or the like.) and/or electronic banking accounts.

In accordance with some embodiments, the account datastore 338 may include any one or more storage devices, including, but not limited to, datastores, databases, and/or any of the other storage devices typically associated with a computer system. It will also be understood that the account datastore 338 may store information in any known way, such as, for example, by using one or more computer codes and/or languages, alphanumeric character strings, data sets, figures, tables, charts, links, documents, and/or the like. Further, in some embodiments, the account datastore 338 includes information associated with one or more applications, such as, for example, the authorization application 337 and/or the transaction application 327. In some embodiments, the account datastore 338 provides a real-time or near real-time representation of the information stored therein, so that, for example, when the processor 334 accesses the account datastore 338, the information stored therein is current or nearly current. Although not shown, in some embodiments, the transaction machine 320 includes a transaction datastore that is configured to store any information associated with the transaction machine 320, the transaction application 327, and/or the like. It will be understood that the transaction datastore can store information in any known way, can include information associated with anything shown in FIG. 3, and/or can be configured similar to the account datastore 338.

Referring now to FIG. 3A, a block diagram is provided that illustrates the mobile device 340 of FIG. 3 in more detail, in accordance with an embodiment of the invention. In some embodiments, the mobile device 340 is a mobile phone (e.g., feature phones, smart phones, or the like.), but in other embodiments, the mobile device 340 can include and/or be embodied as any other mobile device, including, but not limited to, mobile gaming devices, mobile computers (e.g., tablet computers, laptop computers, or the like.), personal digital assistants (PDAs), and/or the like. In some embodiments, the mobile device is configured to send and/or receive communications (e.g., phone calls, text messages, actionable alerts, emails, social media-specific messages, or the like.), present information via a user interface, play video games, and/or the like. In some embodiments, the mobile device is portable (e.g., not stationary) and/or can be carried and/or worn by and/or on a person. As shown in FIG. 3A, the mobile device 340 generally includes a processor 344 operatively connected to such devices as a memory 346, user interface 349 (i.e., user output devices 349A and user input devices 349B), a communication interface 342, a power source 345, a clock or other timer 343, a camera 341, and a positioning system device 390.

The processor 344 may include the functionality to encode and interleave messages and data prior to modulation and transmission. The processor 344 can additionally include an internal data modem. Further, the processor 344 may include functionality to operate one or more software programs, which may be stored in the memory 346. For example, the processor 344 may be capable of operating a connectivity program, such as a web browser application 348. The web browser application 348 may then allow the mobile device 340 to transmit and receive web content, such as, for example, location-based content and/or other web page content, according to a Wireless Application Protocol (WAP), Hypertext Transfer Protocol (HTTP), and/or the like.

The processor 344 is configured to use the communication interface 342 to communicate with one or more other devices on the network 310. In this regard, the communication interface 342 includes an antenna 376 operatively coupled to a transmitter 374 and a receiver 372 (together a "transceiver"). The processor 344 is configured to provide signals to and receive signals from the transmitter 374 and receiver 372, respectively. The signals may include signaling information in accordance with the air interface standard of the applicable cellular system of the wireless telephone network 310. In this regard, the mobile device 340 may be configured to operate with one or more air interface standards, communication protocols, modulation types, and access types. By way of illustration, the mobile device 340 may be configured to operate in accordance with any of a number of first, second, third, and/or fourth-generation communication protocols and/or the like. For example, the mobile device 340 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 340 may also be configured to operate in accordance with non-cellular communication mechanisms, such as via a wireless local area network (WLAN) or other communication/data networks.

The communication interface 342 may also include a near field communication (NFC) interface 370. As used herein, the phrase "NFC interface" generally refers to hardware and/or software that is configured to wirelessly send and/or receive information over relatively short ranges (e.g., within four inches, within three feet, within fifteen feet, or the like.). The NFC interface 370 may include a smart card, key card, proximity card, short range transmission device, radio frequency identification (RFID) tag and/or reader, transmitter, receiver, and/or the like. In some embodiments, the NFC interface 370 communicates information via radio, infrared (IR), and/or optical transmissions. In some embodiments, the NFC interface 370 is configured to operate as an NFC transmitter and/or as an NFC receiver (e.g., an NFC reader, or the like.). In some embodiments, the NFC interface 370 enables the mobile device 340 to operate as a mobile wallet. Also, it will be understood that the NFC interface 370 may be embedded, built, carried, and/or otherwise supported in and/or on the mobile device 340. In some embodiments, the NFC interface 370 is not supported in and/or on the mobile device 340, but the NFC interface 370 is otherwise operatively connected to the mobile device 340 (e.g., where the NFC interface 370 is a peripheral device plugged into the mobile device 340, or the like.). Other apparatuses having NFC interfaces mentioned herein may be configured similarly.

In some embodiments, the NFC interface 370 of the mobile device 340 is configured to wirelessly communicate information to and/or from a corresponding NFC interface of another apparatus (e.g., the transaction machine 320, or the like.). For example, in some embodiments, the mobile device 340 is a mobile phone, the NFC interface 370 is a smart card having account information stored therein, and the transaction machine 320 is a POS device having an NFC reader operatively connected thereto. In such embodiments, when the mobile phone and/or smart card is brought within a relatively short range of the NFC reader, the smart card is configured to wirelessly send the account information to the NFC reader in order to, for example, initiate, perform, complete, and/or otherwise facilitate a transaction.

In addition to the NFC interface 370, the mobile device 340 can have a user interface 349 that is, like other user interfaces described herein, made up of one or more user output devices 349A and/or user input devices 349B. The user output devices 349A include a display 380 (e.g., a liquid crystal display and/or the like) and a speaker 382 and/or other audio device, which are operatively coupled to the processor 344. The user input devices 349B, which allow the mobile device 340 to receive data from a user such as the holder 302, may include any of a number of devices allowing the mobile device 340 to receive data from a user, such as a keypad, keyboard, touch-screen, touchpad, microphone, mouse, joystick, other pointer device, button, soft key, and/or other input device(s). The user interface 349 may also include a camera 341, such as a digital camera.

In some embodiments, the mobile device 340 also includes a positioning system device 390 that can be used to determine the location of the mobile device 340. For example, the positioning system device 390 may include a GPS transceiver. In some embodiments, the positioning system device 390 includes a compass. In some embodiments, the positioning system device 390 is at least partially made up of the antenna 376, transmitter 374, and receiver 372 described above. For example, in one embodiment, triangulation of cellular signals may be used to identify the approximate location of the mobile device 340. In other embodiments, the positioning system device 390 includes a proximity sensor and/or transmitter, such as an RFID tag, that can sense or be sensed by devices known to be located proximate a merchant and/or other location to determine that the mobile device 340 is located proximate these known devices.

The mobile device 340 further includes a power source 345, such as a battery, for powering various circuits and other devices that are used to operate the mobile device 340. Embodiments of the mobile device 340 may also include a clock or other timer 343 configured to determine and, in some cases, communicate actual or relative time to the processor 344 or one or more other devices.

The mobile device 340 also includes a memory 346 operatively connected to the processor 344. As used herein, memory includes any computer readable medium (as defined herein) configured to store data, code, and/or other information. The memory 346 may include volatile memory, such as volatile Random Access Memory (RAM) including a cache area for the temporary storage of data. The memory 346 may also include non-volatile memory, which can be embedded and/or may be removable. The non-volatile memory can additionally or alternatively include an electrically erasable programmable read-only memory (EEPROM), flash memory or the like.

The memory 346 can store any of a number of applications which may include computer-executable instructions/code executed by the processor 344 to implement the functions of the mobile device 340 described herein. For example, the memory 346 may include such applications as a web browser application 348 and/or a mobile banking application 347. It will be understood that the web browser application 348 and/or the mobile banking application 347 can be, individually or collectively, operable (e.g., usable, executable, or the like.) to initiate, perform, complete, and/or facilitate any one or more portions of the process flows 100 and/or 200 described herein and/or one or more portions of the process flows described in connection with FIGS. 4 and/or 5. For example, in some embodiments, the mobile banking application 347 (and/or the web browser application 348) is operable to prompt, via the user interface 349, the holder 302 to input a primary passcode and/or a passcode for the account with unavailable funds or credit into the transaction machine 320 and/or the mobile device 340. As still another example, in some embodiments, the mobile banking application 347 (and/or the web browser application 348) is operable to receive, via the user interface 349, the holder's 302 primary passcode and/or passcode for the account with unavailable funds or credit. In still other embodiments, the mobile banking application 347 (and/or the web browser application 348) is operable to determine that the account will exceed available funds or credit as a result of a transaction. As still another example, in some embodiments, the mobile banking application 347 (and/or the web browser application 348) is operable to provide the holder 302 with a one-time, dynamic, random, and/or transaction-specific passcode for the account with unavailable funds or credit, which may be input into the mobile device 340 and/or transaction machine 320 to, for example, consent to incurring an amount that exceeds the available funds or credit, to incurring an exceeded available funds or credit payment, to completing an surpassed balance transaction, and so on.

In some embodiments, these applications provide a graphical user interface (GUI) on the display 380 that allows the holder 302 to communicate with the mobile device 340, the transaction machine 320, the authorization apparatus 330, and/or one or more other portions of the system 300. In some embodiments, the holder 302 can use the mobile banking application 347 to access the electronic banking account 309 (e.g., mobile banking account, text banking account, or the like.) that is associated with the account. The memory 346 can also store any type and/or amount information used by the mobile device 340, and/or used by the applications and/or the devices that make up the mobile device 340 and/or that are in communication with the mobile device 340, to implement the functions of the mobile device 340 and/or the other systems described and/or contemplated herein. For example, in some embodiments, the memory 346 stores account information (e.g., routing and/or account numbers, account names, username/passwords, primary passcodes, passcode for the account with unavailable funds or credit, biometric information, or the like.) associated with the holder 302 and/or account.

The embodiments illustrated in FIGS. 3 and 3A are exemplary and other embodiments may vary. For example, in some embodiments, some or all of the portions of the system 300 are combined into a single portion. Specifically, in some embodiments, the transaction machine 320 and the authorization apparatus 330 are combined into a single transaction and authorization apparatus that is configured to perform all of the same functions of those separate portions as described and/or contemplated herein. Likewise, in some embodiments, some or all of the portions of the system 300 are separated into two or more distinct portions. In addition, the various portions of the system 300 may be maintained by the same or separate parties.

The system 300 and/or one or more portions of the system 300 may include and/or implement any embodiment of the present invention described and/or contemplated herein. For example, in some embodiments, the system 300 (and/or one or more portions of the system 300) is configured to implement any one or more embodiments of the process flow 100 described and/or contemplated herein in connection with FIG. 1, any one or more embodiments of the process flow 200 described and/or contemplated herein in connection with FIG. 2, any one or more embodiments of the process flow described and/or contemplated herein in connection with FIG. 4, and/or any one or more of embodiments of the process flow described and/or contemplated herein in connection with FIG. 5.

As a specific example, in accordance with an embodiment of the present invention, the authorization apparatus 330 is configured to: (a) receive transaction information associated with a transaction, where the transaction involves the account, the transaction machine 320, and the holder 302, and where the account is associated with the primary passcode 308B (e.g., "3456"), as represented by block 110 in FIG. 1; (b) determine, based at least partially on the transaction information, that the account will exceed available funds or credit as a result of the transaction, as represented by block 120; (c) receive (e.g., via the user interface 349, via the user interface 329, or the like.) the passcode for the account with unavailable funds or credit 308C (e.g., "3457") associated with the account, as represented by block 130; and (e) authorize the transaction based at least partially on receiving the passcode for the account with unavailable funds or credit 308C, as represented by block 140. In accordance with some embodiments, the transaction machine 320, the authorization apparatus 330, and/or the mobile device 340 are each configured to send and/or receive one or more instructions to and/or from each other, such that an instruction sent, for example, from the authorization apparatus 330 to the mobile device 340 (and/or vice versa) can trigger the mobile device 340 (and/or vice versa) to perform one or more portions of any one or more of the embodiments described and/or contemplated herein.

Referring now to FIG. 4, a mixed block and flow diagram of a system 400 for providing a service for unavailable funds using a PIN for the account with unavailable funds and a mobile phone is provided, in accordance with an exemplary embodiment of the present invention. It will be understood that the system 400 illustrated in FIG. 4 represents an example embodiment of the process flow 200 described in connection with FIG. 2. As shown, the system 400 includes a POS device 401 (e.g., the transaction machine 320, a merchant terminal, or the like.), an authorization server 403 (e.g., the authorization apparatus 330, or the like.), and a mobile phone 405 (e.g., the mobile device 340, or the like.). The POS device 401, the authorization server 403, and the mobile phone 405 may each include a communication interface, a user interface, a processor, a memory, an application, and/or a datastore, and those components may be operatively connected to each other.

In accordance with some embodiments, the POS device 401 and the mobile phone 405 are operatively and selectively connected to the authorization server 403 via one or more networks (not shown). For example, in some embodiments, the POS device 401 is operatively connected to the authorization server 403 via a payment network, and/or the mobile phone 405 is operatively connected to the authorization server 403 via a telephone network. Also, the POS device 401 and the mobile phone 405 are accessible to a customer of a financial institution (not shown). Also, in this example embodiment, the POS device 401 is maintained by a merchant, the mobile phone 405 is maintained by the customer of the financial institution, and the authorization server 403 is maintained by the financial institution. Further, in accordance with some embodiments, the financial institution maintains the account held by the customer and associated with the debit card mentioned below. Still further, in this example embodiment, the account is associated with a primary PIN and a PIN for the account with unavailable funds. In some embodiments, these PINS were selected by or assigned to the customer before the transaction referred to in FIG. 4 was initiated (e.g., before the customer performs the function represented by block 402).

As represented by block 402, the customer swipes a debit card at the POS device 401 and inputs the primary PIN into the POS device 401 to engage in a debit card transaction involving the customer and the merchant. Although not shown, the POS device 401 may also authenticate the customer based at least partially on one or more credentials the customer provides to the POS device 401 (e.g., based on the debit card swiped, the primary PIN provided, or the like.). Next, as represented by block 404, the POS device 401 generates and sends an authorization request associated with the debit card transaction to the authorization server 403. In accordance with some embodiments, the authorization request includes information that, for example, identifies the customer, the primary PIN, the account associated with the debit card, the amount of the transaction, the one or more goods and/or services involved in the transaction, and/or the like. As represented by block 406, the authorization server 403 then determines that the account associated with the debit card will cause an account to exceed available funds as a result of the transaction. In this example embodiment, after making the determination that the transaction will cause the account to exceed available funds or credit, the authorization server 403 declines the authorization request, as represented by block 408. Also, as represented by block 410, the authorization server 403 determines that the customer is enrolled in a service for unavailable funds provided by the financial institution. Thereafter, as represented by block 412, the authorization server 403 identifies a phone number associated with the account by, for example, accessing an account datastore and/or account profile having information associated with the account (e.g., the phone number) stored therein. In some embodiments, the customer provides the financial institution with his phone number (e.g., the phone number of the mobile phone 405) when the customer enrolls in the service for unavailable funds.

After the authorization server 403 identifies the phone number, the authorization server 403 sends a text message (e.g., SMS message, MMS message, EMS message, or the like.) to the phone number, which corresponds to the mobile phone 405, as represented by block 414. In accordance with some embodiments, the text message received by the mobile phone 405: (a) notifies the customer of that the transaction may exceed available funds or credit in the account; and (b) prompts the customer to consent to exceeding available funds in the account by: (i) re-swiping the debit card at the POS device 401; and (ii) inputting the PIN for the account with unavailable funds into the POS device 401. In some embodiments, the text message received by the mobile phone 405 is delivered visually to the customer via a display of the mobile phone 405. After reading the text message at the mobile phone 414, the customer re-swipes the debit card at the POS device 401 and inputs the PIN for the account with unavailable funds into the POS device 401, as represented by block 416. In some embodiments, by re-swiping the debit card and/or inputting the PIN for the account with unavailable funds, the customer agrees to causing the account to exceed available funds or credit in order to complete the transaction that may cause the account to exceed available funds, agrees to complete the transaction, and/or agrees to incur one or more exceeded available funds associated with using the service for unavailable funds and/or causing the account to exceed available funds.

After the customer re-swipes the debit card and inputs the PIN for the account with unavailable funds, the POS device 401 generates and sends another authorization request to the authorization server 403, as represented by block 418, which is approved by the authorization server 403, as represented by block 420. In some embodiments, the authorization server 403 approves the second authorization request based at least partially on receiving the customer's PIN for the account with unavailable funds and/or based at least partially on the customer re-swiping his debit card at the POS device 401. After the second authorization request has been approved, the transaction is completed at the POS device 401, as represented by block 422. It will be understood that, in some embodiments, the first authorization request, as represented by block 404, represents the first attempt to complete the transaction referred to in block 402, and the second authorization request, as represented by block 418, represents a second attempt to complete the same transaction. In addition to completing the transaction, in some embodiments, as represented by block 424, the authorization server 403 is configured to generate and/or send an email to the mobile phone 405 that confirms that the customer consented to the causing an account to exceed available funds by inputting the PIN for the account with unavailable funds into the POS device 401.

Of course, the embodiment illustrated in FIG. 4 is merely exemplary and other embodiments may vary without departing from the scope and spirit of the present invention. For example, in some alternative embodiments, the first authorization request is not declined by the authorization server 403, the customer is not required to re-swipe the debit card at the POS device 401, and the second authorization request is never sent. Instead, in such embodiments, after receiving the customer's consent to the cause an account to exceed available funds, the authorization server 403 is configured to approve the first authorization request referred to in block 404, and the transaction is completed at the POS device 401. As another example, in some alternative embodiments, one or more portions of the process flow being performed by the mobile phone 405 are performed instead by the POS device 401. As still another example, in some alternative embodiments of the present invention, instead of involving a debit card, a checking account, a debit card transaction, and/or a service for unavailable funds, the process flow shown in FIG. 4 involves a credit card, a credit card account, a credit card transaction, and/or a service for credit. As still another example, in some alternative embodiments, the customer does not need to re-swipe the debit card at the POS device 401 to complete the transaction that may cause the account to exceed available funds; instead, the customer need only input the PIN for the account with unavailable funds at the POS device 401.

As yet another example, in some alternative embodiments, the customer is not prompted via the mobile phone 405 to input the PIN for the account with unavailable funds into the POS device 401; rather, in such embodiments, the customer is prompted to input the PIN for the account with unavailable funds into the POS device 401 based at least partially on the transaction being declined (e.g., the transaction being declined is what prompts the customer to input the PIN for the account with unavailable funds). As another example, in some alternative embodiments, the customer is prompted (e.g., via the mobile phone 405, via the POS device 401, or the like.) to input the PIN for the account with unavailable funds into the mobile phone 405 (e.g., into an input field of a mobile banking application executing on the mobile phone 405) instead of inputting the PIN for the account with unavailable funds into the POS device 401. As another example, in some alternative embodiments, the customer receives the PIN for the account with unavailable funds in the text message referred to in block 414. In some of these embodiments, the customer does not know the identity of the PIN for the account with unavailable funds before the text message is sent (e.g., the server 403 dynamically generates the PIN for the account with unavailable funds after determining that the account will exceed available funds).

In some embodiments, one or more of the portions of the process flow represented by blocks 402-424 are triggered by one or more triggering events, which, in some embodiments, include the performance of one or more of the other portions of the process flow represented by blocks 402-424. Also, in some embodiments, the system 400 is configured to perform the entire process flow represented by blocks 402-424, from start to finish, within moments, seconds, and/or minutes. For example, in some embodiments, the customer inputs the PIN for the account with unavailable funds into the POS device 401 within approximately 1-5 minutes of the authorization server 403 receiving the authorization request from the POS device 401. Further, it will be understood that one or more portions of the process flow represented by blocks 402-424 are configured to comply with one or more requirements of a regulations pertaining to exceeded available funds or credit (e.g., Regulation E and/or the CARD Act in the United States).

Referring now to FIG. 5, a mixed block and flow diagram of a system 500 for providing a service for credit using a password for the account that exceeded credit threshold and a mobile phone having an NFC interface is provided, in accordance with an exemplary embodiment of the present invention. It will be understood that the system 500 illustrated in FIG. 5 represents an example embodiment of the process flow 100 described in connection with FIG. 1. As shown, the system 500 includes a POS device 501 having an NFC interface, a mobile phone 503 having an NFC interface, and an authorization server 505. The POS device 501, the mobile phone 503, and the authorization server 505 may each include a communication interface, a user interface, a processor, a memory, an application, and/or a datastore, and those components may be operatively connected to each other.

In accordance with some embodiments, the POS device 501 and the mobile phone 503 are operatively and selectively connected to the authorization server 505 via one or more networks (not shown). For example, in some embodiments, the POS device 501 is operatively connected to the authorization server 505 via a payment network, and/or the mobile phone 503 is operatively connected to the authorization server 505 via a telephone network. In addition, the NFC interface of the mobile phone 503 and the NFC interface of the POS device 501 enable the mobile phone 503 to wirelessly communicate with the POS device 501. For example, in some embodiments, the mobile phone 503 includes an RF transmitter that is configured to wirelessly communicate account and/or transaction information to and/or from an NFC reader associated with the POS device 501. As such, in accordance with some embodiments, the mobile phone 503 is configured to operate as a mobile wallet.

It will be understood that the POS device 501 and the mobile phone 503 are accessible to the customer referred to in block 502. Also, in this example embodiment, the POS device 501 is maintained by a merchant, the mobile phone 503 is maintained by the customer, and the authorization server 505 is maintained by a bank. Further, in accordance with some embodiments, the bank maintains the credit card account held by the customer, and the mobile phone is associated with the credit card account.

As represented by block 502, the customer logs in to a mobile banking application that is installed and/or executes on the mobile phone 503. In some embodiments, the mobile banking application authenticates the customer before providing the customer access to the mobile banking application. In some embodiments, the mobile banking application authenticates the customer based at least partially on one or more credentials provided by the customer to the application (e.g., a primary password for the credit card account).

After logging in, the customer presents the mobile phone 503 to the POS device 501 to engage in the transaction, as represented by block 504. For example, in some embodiments, the customer "taps" the mobile phone 503 to the POS device 501 by holding the NFC interface of the mobile phone 503 within a relatively short range of (e.g., within approximately four inches of, or the like.) the NFC interface of the POS device 501. When the mobile phone 503 is presented to the POS device 501, the POS device 501 receives credit card account information from the mobile phone 503, as represented by block 506. In some embodiments, the credit card account information includes the credit card account number, the primary password for the account, the name of the customer, and/or the like. Thereafter, the POS device 501 generates and sends an authorization request associated with the transaction to the authorization server 505, as represented by block 508. In accordance with some embodiments, the authorization request includes information that, for example, identifies the customer, the credit card account associated with the mobile phone, the primary password for the account, the amount of the transaction, the one or more goods and/or services involved in the transaction, and/or the like. After receiving the authorization request, as represented by block 510, the authorization server 505 determines that the credit card account involved in the transaction will exceed credit threshold as a result of the transaction. After making the determination that the transaction may exceed credit, the authorization server 505, in this example embodiment, determines that the customer is enrolled in a service for credit provided by the bank, as represented by block 512. Thereafter, as represented by block 514, the authorization server 505 identifies a mobile phone associated with the credit card account (e.g., the mobile phone 503). In some embodiments, the server 505 identifies the mobile phone by identifying a phone number associated with the account, which in some embodiments, is stored in an account profile associated with the account. For example, in some embodiments, the customer provides the financial institution with his phone number (e.g., the phone number of the mobile phone 503) when the customer enrolls in the service for credit.

After the authorization server 505 identifies the mobile phone, the authorization server 505 sends a communication (e.g., text message, automated phone call, mobile banking application-specific notification, actionable alert, email, social media-specific message, or the like.) to the mobile phone 503, as represented by block 516. In accordance with some embodiments, the communication notifies the customer of the exceeding credit threshold amount and/or prompts the customer to consent to exceeding credit threshold by inputting the password for the account that exceeded credit threshold password for the account into the mobile phone 503. In some embodiments, the communication received by the mobile phone 503 is delivered visually to the customer via a display of the mobile phone 503 and/or audibly via a speaker of the mobile phone 503. After perceiving the communication at the mobile phone 503, the customer consents to exceeding credit threshold by inputting the password for the account that exceeded credit threshold into the mobile phone 503, as represented by block 518. For example, in some embodiments, the customer uses a keypad to input the password for the account that exceeded credit threshold (e.g., "3450") into a mobile banking application-specific input field displayed on the mobile phone 503. As another example, in some embodiments, the customer sends a return text message to the server 505, where the return text message includes the password for the account that exceeded credit threshold. In some embodiments, by inputting the password for the account that exceeded credit threshold into the mobile phone 503, the customer agrees to the amount exceeding credit threshold, agrees to exceeding the credit threshold of the credit card account, agrees to complete the transaction that may cause the account to exceed credit threshold, and/or agrees to incurring an exceeded credit threshold payment for using surpassed credit service and/or for exceeding credit threshold.

After the customer inputs the password for the account that exceeded credit threshold, the authorization server 505 approves the authorization request, as represented by block 520. As represented by block 522, the authorization server 505 also generates and sends an electronic receipt associated with the credit card transaction to the mobile banking account. In some embodiments, this electronic receipt serves as a confirmation message to confirm that the customer entered the password for the account that exceeded credit threshold into the mobile phone 503 and/or to confirm the customer's consent to exceeding credit threshold and/or to completing the transaction. After the authorization request has been approved, the transaction is completed at the POS device 501, as represented by block 524.

Of course, the embodiment illustrated in FIG. 5 is merely exemplary and other embodiments may vary without departing from the scope and spirit of the present invention. For example, in some embodiments, one or more portions of the process flow being performed by the authorization server 505 are performed instead by the mobile phone 503. As another example, in some alternative embodiments of the present invention, instead of involving a credit card account and/or a service for exceeding credit, the system 500 shown in FIG. 5 involves a deposit account, an account exceeding available funds, and/or a service for unavailable funds.

Also, in some embodiments, one or more of the portions of the process flow represented by blocks 502-524 are triggered by one or more triggering events, which, in some embodiments, include the performance of one or more of the other portions of the process flow represented by blocks 502-524. Also, in some embodiments, the system 500 is configured to perform the entire process flow represented by blocks 502-524, from start to finish, within moments, seconds, and/or minutes. For example, in some embodiments, the customer inputs the password for the account that exceeded credit threshold (and/or consents exceeding credit threshold) within approximately 1-5 minutes of the authorization server 505 receiving the authorization request from the POS device 501. Further, it will be understood that one or more portions of the process flow represented by blocks 502-524 are configured to comply with one or more requirements of a regulation pertaining to exceeded available funds or credit (e.g., Regulation E and/or the CARD Act in the United States, or the like.).

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, or the like.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, or the like.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method comprising:
    enrolling, via a computer processing device, an account holder in an exceeded available funds or credit service for an account;
    receiving, via the computer processing device, transaction information associated with a transaction, wherein the transaction involves the account, and wherein receiving the transaction information further comprises receiving, from the account holder, a primary passcode for authorizing transactions associated with the account;
    determining, using the computer processing device, based at least partially on the transaction information, that the account will exceed available funds or credit as a result of processing the transaction;
    in response to determining that the account will exceed available funds or credit as a result of processing the transaction, determining that the account holder has enrolled in the exceeded available funds or credit service for the account;
    identifying a mobile device of the account holder based on determining that the account holder has enrolled in the exceeded available funds or credit service;
    in response to determining that the account holder has enrolled in the exceeded available funds or credit service, prompting, via the computer processing device, the account holder to provide a secondary passcode for authorizing transactions that will exceed the available funds or credit of the account as a result of processing the transactions, wherein the secondary passcode is a single-use passcode, wherein prompting the account holder comprises causing the mobile device to display a graphical user interface that is configured to receive the secondary passcode from the account holder;
    receiving, via the computer processing device, the secondary passcode for authorizing transactions that will exceed the available funds or credit of the account as a result of processing the transactions, wherein the secondary passcode indicates that the account holder consents to causing the account to exceed the available funds or credit of the account as a result of processing the transaction; and
    authorizing, using the computer processing device, the transaction based at least partially on the determining that the account holder has enrolled in the exceeded available funds or credit service and receiving the secondary passcode.

2. The method of claim 1, wherein the transaction involves a holder of the account, the method further comprising:
    declining the transaction based at least partially on the determining that the account will exceed available funds or credit, and
    wherein the receiving the secondary passcode for the account with unavailable funds or credit comprises receiving the secondary passcode for the account with unavailable funds or credit from the holder after the declining the transaction.

3. The method of claim 1, further comprising:
    receiving second transaction information associated with a second transaction, wherein the second transaction involves a second account, and wherein the second account is associated with the primary passcode;
    determining, based at least partially on the second transaction information, that the second account will exceed available funds or credit as a result of the second transaction;
    receiving the primary passcode; and
    declining the second transaction based at least partially on the receiving the primary passcode.

4. The method of claim 1, wherein the secondary passcode is a four digit personal identification number (PIN).

5. A computer program product comprising a non-transitory computer-readable medium, wherein the non-transitory computer-readable medium comprises one or more computer-executable program code portions that, when executed by a computer, cause the computer to:
    enroll an account holder in an exceeded available funds or credit service for an account;
    receive transaction information associated with a transaction, wherein the transaction involves the account, and wherein receiving the transaction information further comprises receiving, from the account holder, a primary passcode for authorizing transactions associated with the account;
    determine, based at least partially on the transaction information, that the account will exceed available funds or credit as a result of processing the transaction;
    in response to determining that the account will exceed available funds or credit as a result of processing the transaction, determine that the account holder has enrolled in the exceeded available funds or credit service for the account;
    identify a mobile device of the account holder based on determining that the account holder has enrolled in the exceeded available funds or credit service;
    in response to determining that the account holder has enrolled in the exceeded available funds or credit service, prompt the account holder to provide a secondary passcode for authorizing transactions that will exceed the available funds or credit of the account as a result of processing the transactions, wherein the secondary passcode is a single-use passcode, wherein prompting the account holder comprises causing the mobile device to display a graphical user interface that is configured to receive the secondary passcode from the account holder;
    receive the secondary passcode for authorizing transactions that will exceed the available funds or credit of the account as a result of processing the transactions wherein the secondary passcode indicates that the account holder consents to causing the account to exceed the available funds or credit of the account as a result of processing the transaction; and authorize the transaction based at least partially on the computer receiving the secondary passcode and determining that the account holder has enrolled in the exceeded available funds or credit service.

6. The computer program product of claim 5, wherein the holder carries the mobile device during the transaction, and wherein the one or more computer-executable program code portions, when executed by the computer, cause the computer to:

send a message to the mobile device, wherein the message prompts the holder to input the secondary passcode for the account with unavailable funds or credit into the mobile device, and wherein the computer sends the message after the computer determines that the account will exceed available funds or credit, and wherein the computer receives the secondary passcode for the account with unavailable funds or credit after the computer sends the message, and wherein the computer receives the secondary passcode for the account with unavailable funds or credit based at least partially on the holder inputting the secondary passcode for the account with unavailable funds or credit into the mobile device.

7. The computer program product of claim 5, wherein the one or more computer-executable program code portions, when executed by the computer, cause the computer to:

send the secondary passcode for the account with unavailable funds or credit to the holder before the computer receives the secondary passcode for the account with unavailable funds or credit, wherein the secondary passcode for the account with unavailable funds or credit is not known to the holder before the secondary passcode for the account with unavailable funds or credit is sent to the holder.

8. The computer program product of claim 5, wherein the one or more computer-executable program code portions, when executed by the computer, cause the computer to:

decline the transaction based at least partially on the computer determining that the account will exceed available funds or credit, and wherein the computer receives the secondary passcode for the account with unavailable funds or credit after the transaction is declined.

9. A method comprising:

enrolling an account holder in an exceeded available funds or credit service for an account;

determining, using a transaction machine, that the account holder has initiated a transaction, wherein the transaction machine comprises a display, receipt printer, dispenser, and deposit mechanism, wherein the transaction involves the account, and wherein the account is associated with a primary passcode;

transmitting, using the transaction machine, an authorization request associated with the transaction;

receiving, using a computer processing device, the authorization request associated with the transaction;

determining, using the computer processing device, that the account has exceeded available funds or credit to cover the transaction;

determining, using the computer processing device, that the account holder has enrolled in the exceeded available funds or credit service for the account;

determining, using the computer processing device, that the authorization request comprises the primary passcode;

declining, using the computer processing device, the authorization request based at least partially on the determining that the authorization request comprises the primary passcode and the determining that the account has exceeded available funds or credit;

identifying a mobile device of the account holder;

in response to (i) declining the authorization request based at least partially on determining that the account has exceeded available funds or credit and (ii) determining that the account holder has enrolled in the exceeded available funds or credit service for the account, automatically prompt, using the computer processing device, the account holder to (i) provide a secondary passcode for authorizing transactions that will exceed the available funds or credit of the account as a result of processing the transactions and (ii) repeat the transaction, wherein the secondary passcode is a single-use passcode, wherein, based on identifying the mobile device, prompting the account holder comprises causing the mobile device to display a graphical user interface that is configured to receive the secondary passcode from the account holder;

determining, using the transaction machine, that an account holder has initiated the transaction;

transmitting, using the transaction machine, a second authorization request associated with the transaction;

receiving, using the computer processing device, the second authorization request associated with the transaction, wherein the transaction involves the account;

receiving the secondary passcode from the mobile device;

approving, using the computer processing device, the second authorization request based at least partially on receiving the secondary passcode from the mobile device and the customer being enrolled in the exceeded available funds or credit service;

completing, using the transaction machine, the transaction, wherein completing the transaction comprises printing a receipt or statement.

10. The method of claim 9, wherein the transaction and the second transaction are the same transaction.

* * * * *